June 9, 1959

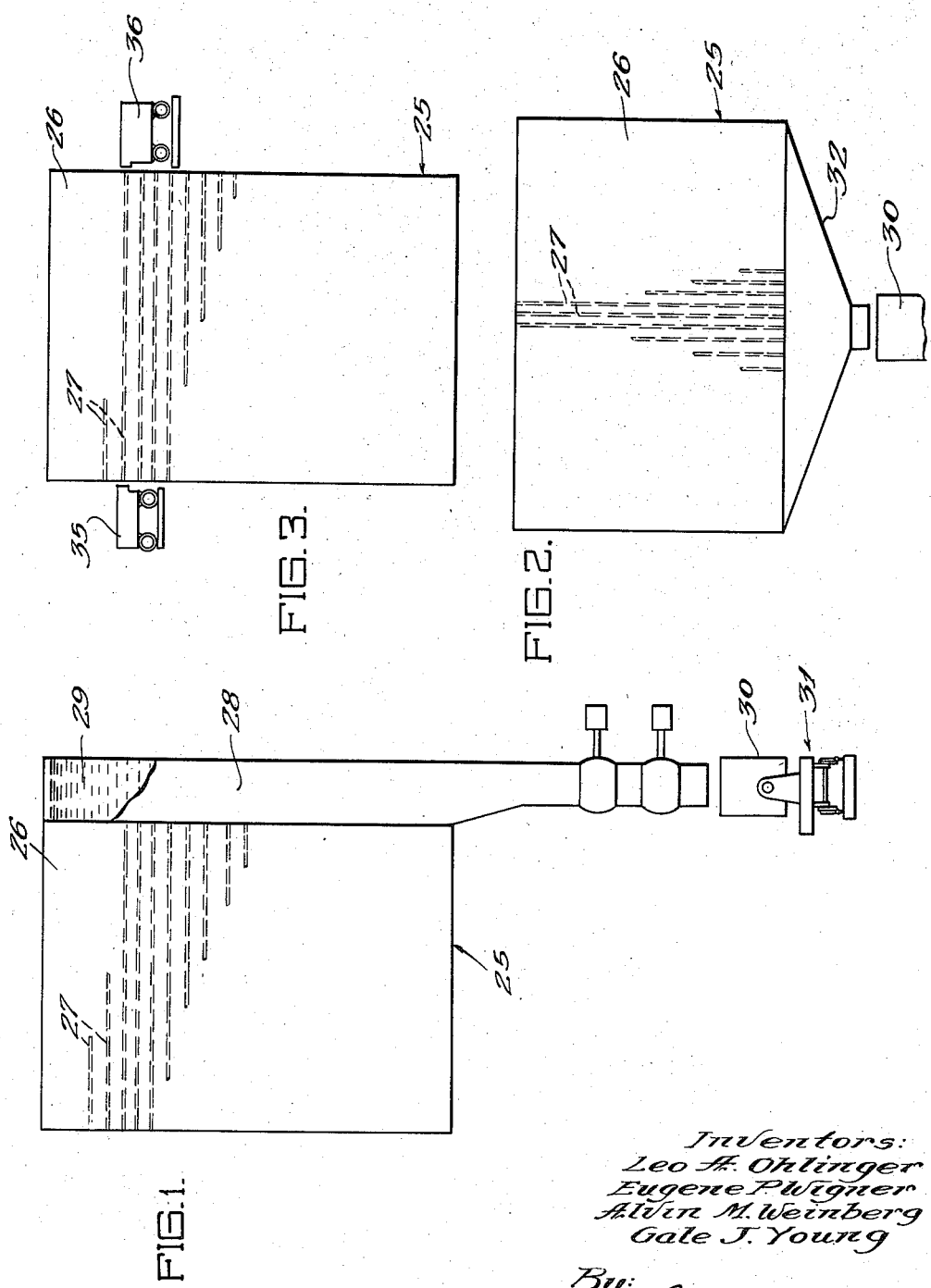

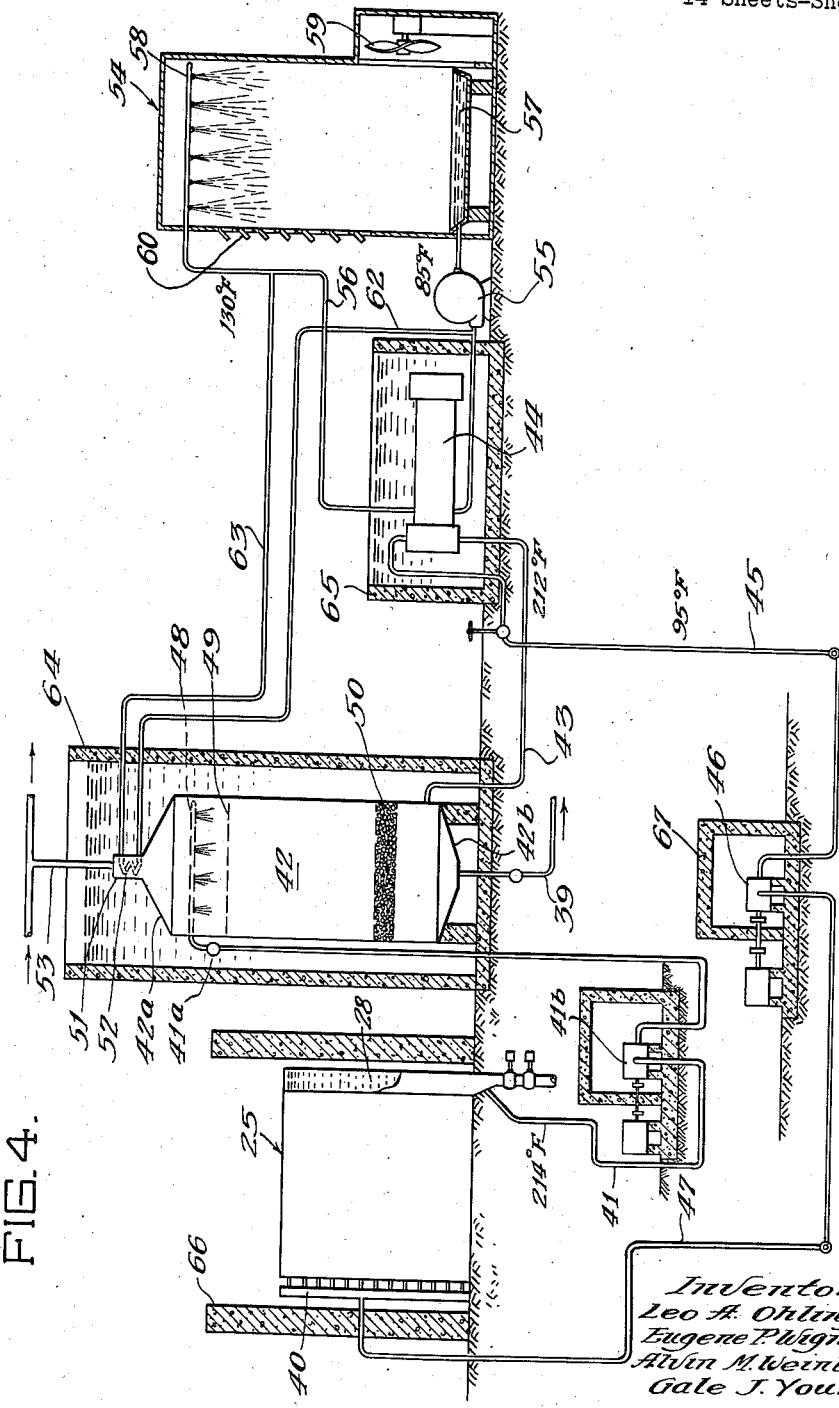

L. A. OHLINGER ET AL 2,890,158

NEUTRONIC REACTOR

Filed Dec. 19, 1944

Inventors:
Leo A. Ohlinger
Eugene P. Wigner
Alvin M. Weinberg
Gale J. Young
By: Robert A. Lavender
Attorney.

Inventors:
Leo A. Ohlinger
Eugene P. Wigner
Alvin M. Weinberg
Gale J. Young

By: Robert A. Lavender
Attorney

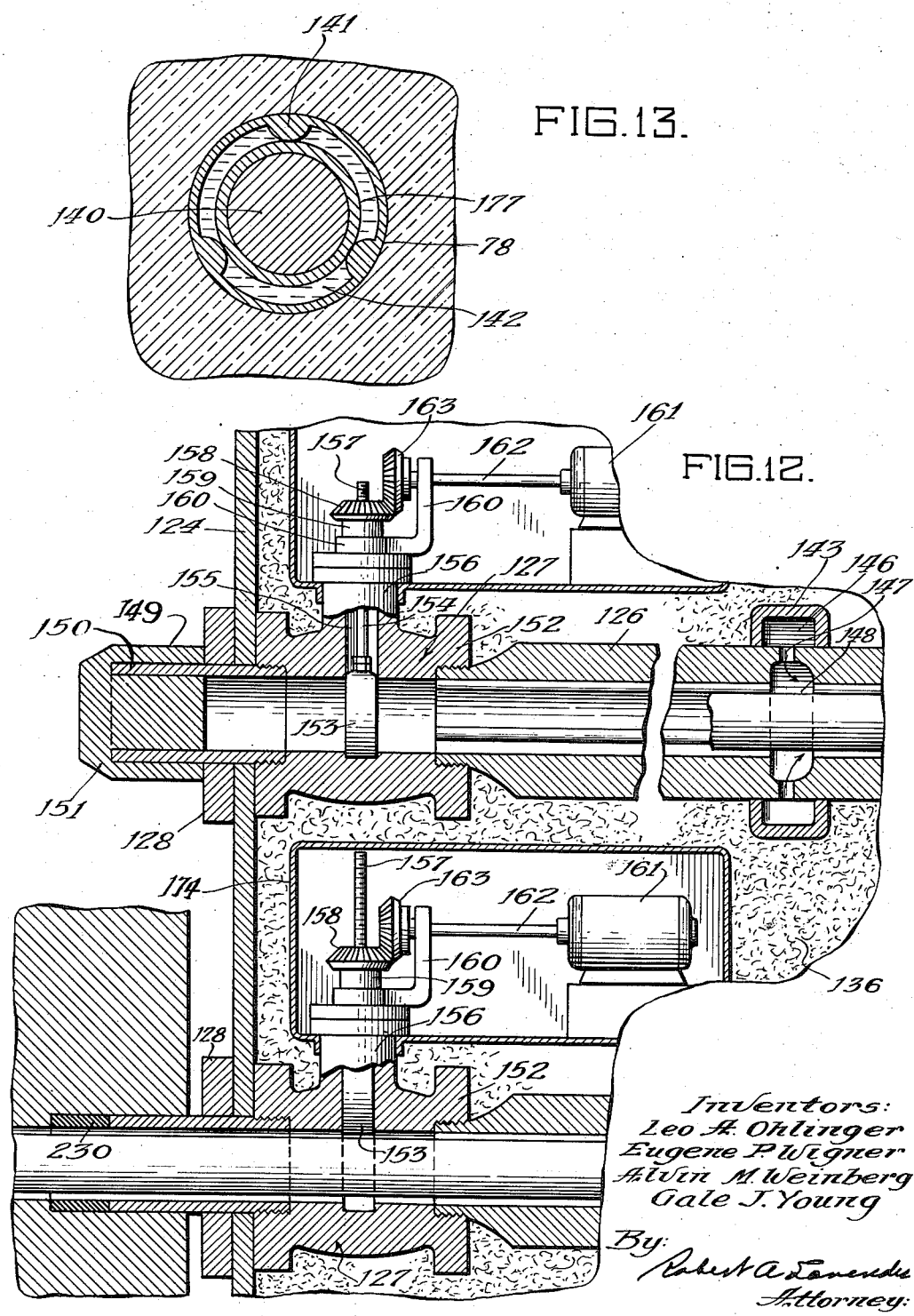

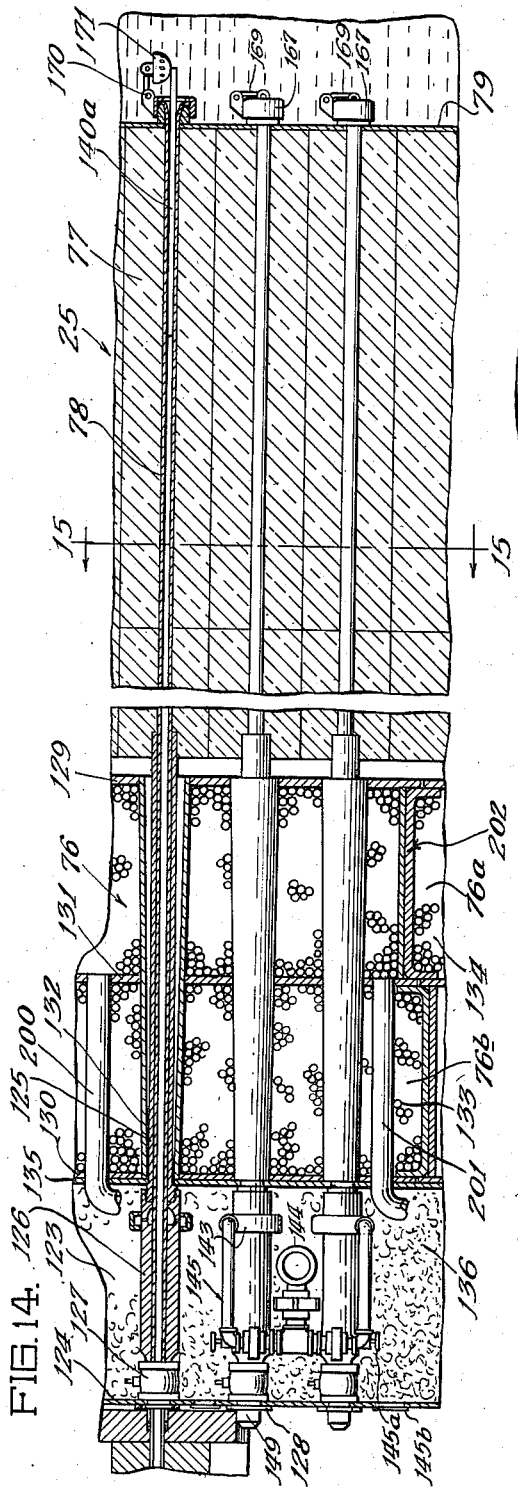

June 9, 1959 L. A. OHLINGER ET AL 2,890,158
NEUTRONIC REACTOR
Filed Dec. 19, 1944 14 Sheets-Sheet 10

Inventor:
Leo A. Ohlinger
Eugene P. Wigner
Alvin M. Weinberg
Gale J. Young
By: Robert A. Lavender
Attorney June 9, 1959

L. A. OHLINGER ET AL 2,890,158

NEUTRONIC REACTOR

Filed Dec. 19, 1944

Inventors:
Leo A. Ohlinger
Eugene P. Wigner
Alvin M. Weinberg
Gale J. Young

By: Robert A. Lavender
Attorney.

June 9, 1959  L. A. OHLINGER ET AL  2,890,158
NEUTRONIC REACTOR

Filed Dec. 19, 1944  14 Sheets-Sheet 12

Inventors:
Leo A. Ohlinger
Eugene P. Wigner
Alvin M. Weinberg
Gale J. Young

By: Robert A. Lavender
Attorney

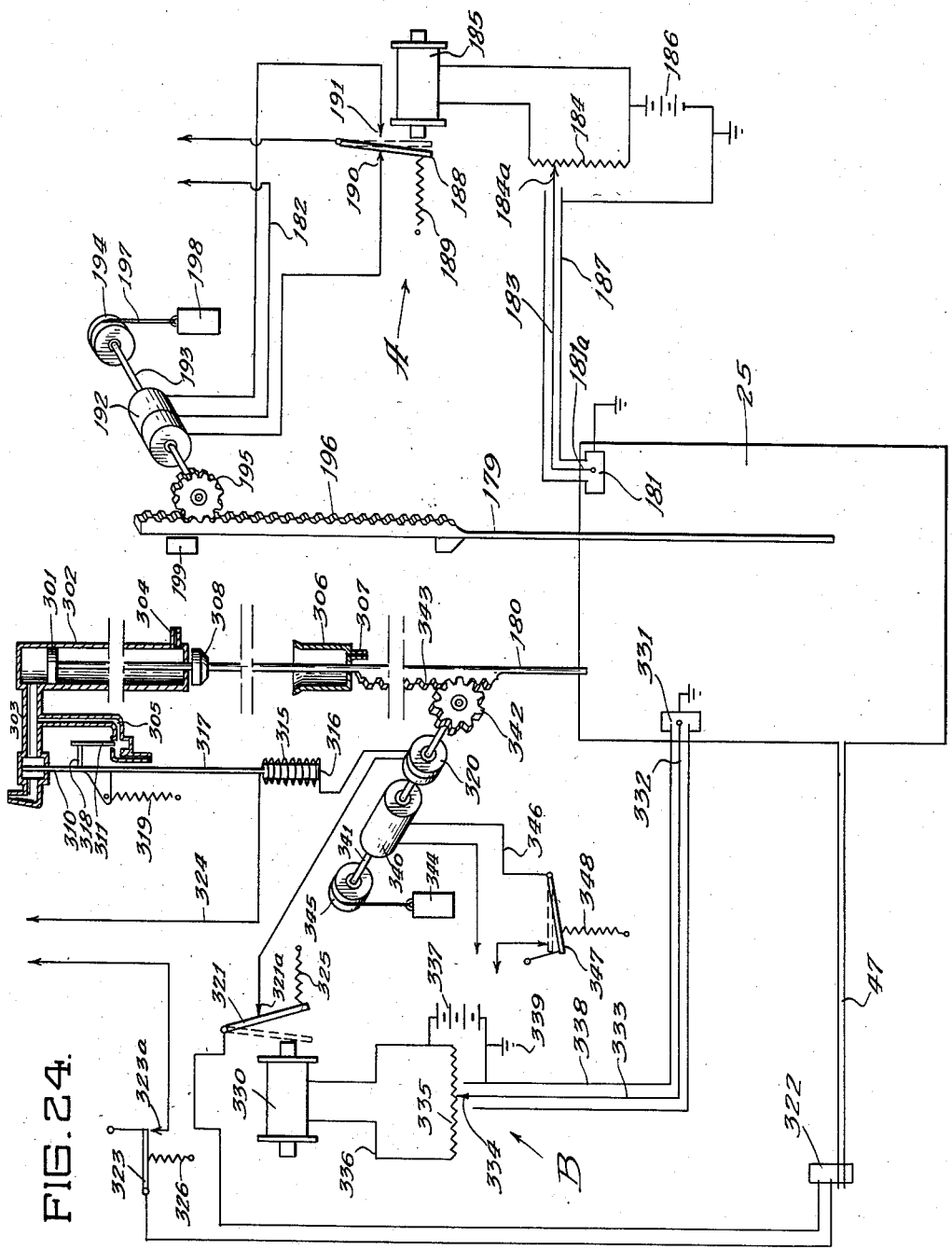

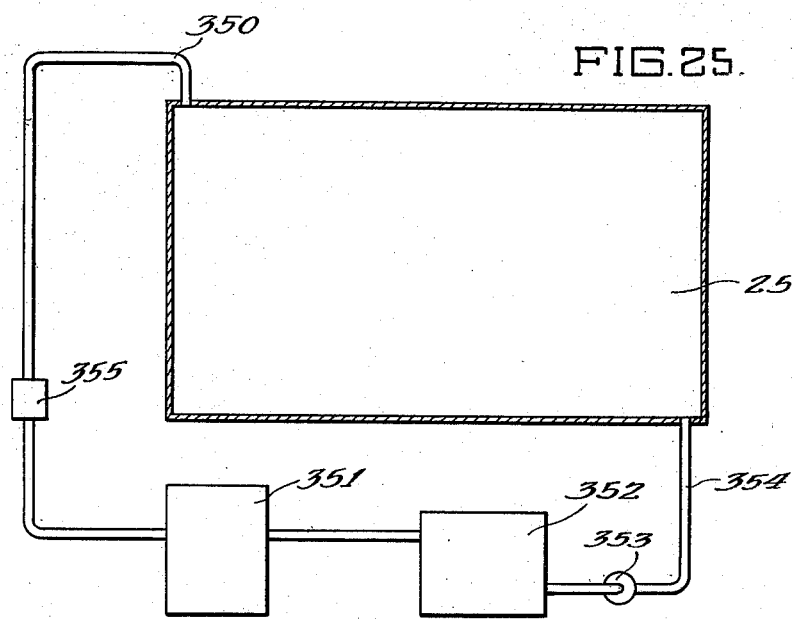
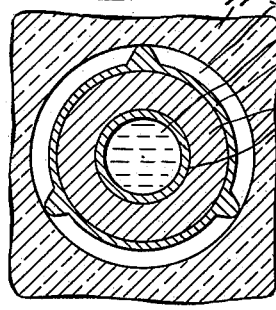
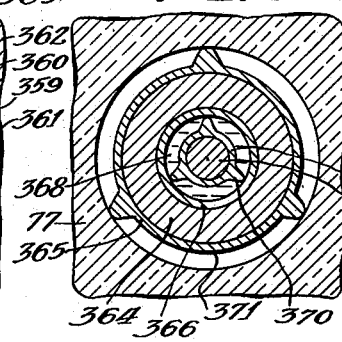
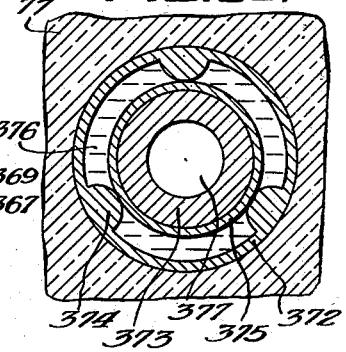
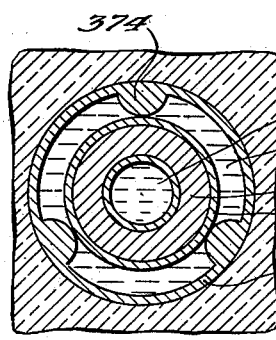
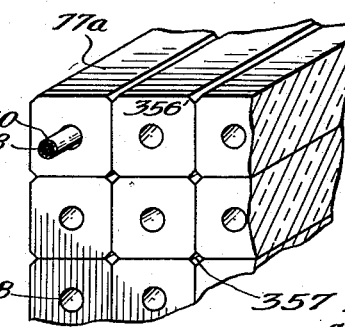

United States Patent Office 2,890,158
Patented June 9, 1959

2,890,158

NEUTRONIC REACTOR

Leo A. Ohlinger, Eugene P. Wigner, Alvin M. Weinberg, and Gale J. Young, Chicago, Ill., assignors to the United States of America as represented by the United States Atomic Energy Commission Application December 19, 1944, Serial No. 568,900

15 Claims. (Cl. 204—193.2)

The present invention relates to the subject of neutronics, and more particularly to the charging of bodies containing fissionable material into and the discharging of same from a liquid cooled neutron chain reacting system, also referred to as a neutronic reactor, or pile, the latter name having been originally adopted for the active portions of systems employing uranium or other fissionable bodies geometrically arranged in graphite or other moderator in the form of lattice structures. As a result of the chain reaction, when $U^{238}$ is present (as in natural uranium) transuranic element $94^{239}$, known as plutonium, is produced. This material is fissionable and is valuable when added to natural uranium for use in a chain reacting system, as a fissionable body in lieu of or in conjunction with natural uranium.

Natural uranium contains both uranium isotopes $U^{235}$ and $U^{238}$ in the ratio of 1 to 139. The $U^{235}$ is the isotope fissionable by slow neutrons.

When fission occurs in the $U^{235}$ isotope, the following reaction takes place:

$$_{92}U^{235} + \text{neutron} \rightarrow A + B + \text{about 2 neutrons (average)}$$

where:

"A" represents "light" fission fragments having atomic masses ranging from 83 to 99 inclusive and atomic numbers from 34 to 45 inclusive; for example, Br, Kr, Rb, Sr, Y, Zr, Cb, Mo, Ma, Ru, and Rh; and "B" represents "heavy" fission fragments having atomic masses ranging from 127 to 141 inclusive, and atomic numbers from 51 to 60 inclusive; for example, Sb, Te, I, Xe, Cs, Ba, La, Ce, Pr, and Nd.

The elements resulting from the fissions are unstable and radioactive, with half-lives varying in length in accordance with the element formed.

The absorption of thermal or resonance neutrons by the $U^{238}$ isotope gives rise to the conversion of $U^{238}$ to $U^{239}$ which ultimately decays to transuranic element $94^{239}$. The reaction is as follows:

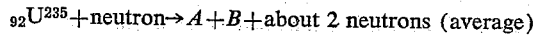
$92^{238} + n \longrightarrow 92^{239}$ [plus 6 m. e. v. of $\gamma$ rays, not necessarily all of one frequency]

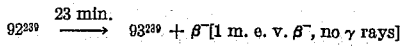
$92^{239} \xrightarrow{23 \text{ min.}} 93^{239} + \beta^-[1 \text{ m. e. v. } \beta^-, \text{ no } \gamma \text{ rays}]$

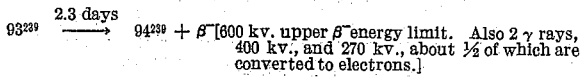
$93^{239} \xrightarrow{2.3 \text{ days}} 94^{239} + \beta^-[600 \text{ kv. upper } \beta^- \text{energy limit. Also 2 } \gamma \text{ rays,}$
400 kv., and 270 kv., about ½ of which are converted to electrons.]

Most of the neutrons arising from the fission process are set free with the very high energy of above one million electron volts average and are therefore not in condition to be utilized efficiently to create new thermal neutron fissions in a fissionable body such as $U^{235}$ when it is mixed with a considerable quantity of $U^{238}$, particularly as in the case of natural uranium. The energies of the fission-released neutrons are so high that most of the latter would tend to be absorbed by the $U^{238}$ nuclei, and yet the energies are not generally high enough for production of fission by more than a small fraction of the neutrons so absorbed. For neutrons of thermal energies, however, the absorption cross-section of $U^{235}$, to produce fission, is a great deal more than the simple capture cross-section of $U^{238}$; so that under the stated circumstances the fast fission neutrons, after they are created, must be slowed down to thermal energies before they are most effective to produce fresh fission by reaction with additional $U^{235}$ atoms. If a system can be made in which neutrons are slowed down without excessive absorption until they reach thermal energies and then mostly enter into uranium rather than into any other element, a self-sustaining nuclear chain reaction can be obtained, even with natural uranium. Light elements, such as deuterium, beryllium, oxygen or carbon, the latter in the form of graphite, can be used as slowing agents. A special advantage of the use of light elements mentioned for slowing down fast fission neutrons is that fewer collisions are required for slowing than is the case with heavier elements, and furthermore, the above-enumerated elements have very small neutron capture probabilities, even for thermal neutrons. Hydrogen would be most advantageous were it not for the fact that there may be a relatively high probability of neutron capture by the hydrogen nucleus. Carbon in the form of graphite is a relatively inexpensive, practical, and readily available agent for slowing fast neutrons to thermal energies. Recently, beryllium has been made available in sufficiently large quantities for test as to suitability for use as a neutron slowing material in a system of the type to be described. It has been found to be in every way as satisfactory as carbon. Deuterium while more expensive is especially valuable because of its low absorption of neutrons and its compounds such as deuterium oxide have been used with very effective results.

However, in order for the premise to be fulfilled that the fast fission neutrons be slowed to thermal energies in a slowing medium without too large an absorption in the $U^{238}$ isotope of the uranium, certain types of physical structure should be utilized for the most efficient reproduction of neutrons, since unless precautions are taken to reduce various neutron losses and thus to conserve neutrons for the chain reaction the rate of neutron reproduction may be lowered and in certain cases lowered to a degree such that a self-sustaining system is not attained.

The ratio of the number of fast neutrons produced by the fissions, to the original number of fast neutrons creating the fissions, in a system of infinite size using specific materials is called the reproduction or multiplication factor of the system and is denoted by the symbol K. If K can be made sufficiently greater than unity to create a net gain in neutrons and the system made sufficiently large so that this gain is not entirely lost by leakage from the exterior surface of the system, then a self-sustaining chain reacting system can be built to produce power by nuclear fission of natural uranium. The neutron reproduction ratio $r$ in a system of finite size differs from K by the leakage factor, and must be sufficiently greater than unity to permit the neutron density to rise exponentially. Such a rise will continue indefinitely if not controlled at a desired density corresponding to a desired power output.

During the interchange of neutrons in a system comprising bodies of uranium of any size in a slowing medium, neutrons may be lost in four ways, by absorption in the uranium metal or compound without producing fission, by absorption in the slowing down material, by absorption in impurities present in the system, and by leakage from the system. These losses will be considered in the order mentioned.

Natural uranium, particularly by reason of its $U^{238}$ content, has an especially strong absorbing power for neutrons when they have been slowed down to moderate energies. The absorption in uranium at these energies is termed the uranium resonance absorption or capture.

It is caused by the isotope $U^{238}$ and does not result in fission but creates the isotope $U^{239}$ which by two successive beta emissions forms the relatively stable nucleus $94^{239}$. It is not to be confused with absorption or capture of neutrons by impurities, referred to later. Neutron resonance absorption in uranium may take place either on the surface of the uranium bodies, in which case the absorption is known as surface resonance absorption, or it may take place further in the interior of the uranium body, in which case the absorption is known as volume resonance absorption. It will be appreciated that this classification of resonance absorptions is merely a convenient characterization of observed phenomena, and arises, not because the neutron absorbing power of a $U^{238}$ nucleus is any greater when the nucleus is at the surface of a body of metallic, or combined uranium, but because the absorbing power of $U^{238}$ nuclei for neutrons of certain particular energies is inherently so high that practically all neutrons that already happen to have those energies, called resonance energies as explained above, are absorbed almost immediately upon their arrival in the body of uranium metal or uranium compound, and thus in effect are absorbed at the surface of such body. Volume resonance absorption is due to the fact that some neutrons make collisions inside the uranium body and may thus arrive at resonance energies therein. After successfully reaching thermal velocities, about 40 percent of the neutrons are also subject to capture by $U^{238}$ without fission, to produce $U^{239}$ and eventually $94^{239}$.

It is possible, by proper physical arrangement of the materials, to reduce substantially uranium resonance absorption. By the use of light elements as described above for slowing materials, a relatively large increment of energy loss is achieved in each collision and therefore fewer collisions are required to slow the neutrons to thermal energies, thus decreasing the probability of a neutron being at a resonance energy as it enters a uranium atom. During the slowing process, however, neutrons are diffusing through the slowing medium over random paths and distances so that the uranium is not only exposed to thermal neutrons but also to neutrons of energies varying between the emission energy of fission and thermal energy. Neutrons at uranium resonance energies will, if they enter uranium at these energies, be absorbed on the surface of a uranium body whatever its size, giving rise to surface absorption. Any substantial reduction of overall surface of the same amount of uranium relative to the amount of slowing material (i.e. the amount of slowing medium remaining unchanged) will reduce surface absorption, and any such reduction in surface absorption will release neutrons to enter directly into the chain reaction, i.e., will increase the number of neutrons available for further slowing and thus for reaction with $U^{235}$ to produce fission.

For a given ratio of slowing material to uranium, surface resonance absorption losses of neutrons in the uranium can be reduced by a large factor from the losses occurring in a mixture of fine uranium particles and a slowing medium, if the uranium is aggregated into substantial masses in which the mean radius of the aggregates is at least 0.25 centimeter for natural uranium metal and when the mean spatial radius of the bodies is at least 0.75 centimeter for the oxide of natural uranium ($UO_2$). Proportionate minimums exist for other uranium compounds the exact minimum value being dependent upon the uranium content and the density of the product. An important gain is thus made in the number of neutrons made directly available for the chain reaction. A similar gain is made when the uranium has more than the natural content of fissionable material. Where a maximum K factor is to be desired we place the uranium in the system in the form of spaced uranium masses or bodies of substantial size, preferably either of metal, oxide, carbide, or other compound or combinations thereof. The uranium bodies can be in the form of layers, rods or cylinders, cubes or spheres, or approximate shapes, dispersed throughout the graphite, preferably in some geometric pattern. The term geometric is used to mean any pattern or arrangement wherein the uranium bodies are distributed in the graphite or other moderator with at least either a roughly uniform spacing or with a roughly systematic non-uniform spacing, and are at least roughly uniform in size and shape or are systematic in variations of size or shape to produce a volume pattern conforming to a roughly symmetrical system. If the pattern is a repeating or rather exactly regular one, a system embodying it may be conveniently described as a lattice structure. Optimum conditions are obtained with natural uranium by using a lattice of metal spheres.

The number of neutrons made directly available to the chain reaction by aggregating the uranium into separate bodies spaced through the slowing medium is a critical factor in obtaining a self-sustaining chain reaction utilizing natural uranium and graphite. The K factor of a mixture of fine uranium particles in graphite, assuming both of them to be theoretically pure, would only be about .785. Actual K factors as high as 1.07 have been obtained using aggregation of natural uranium in the best known geometry, and with as pure materials as it is presently possible to obtain.

Assuming theoretically pure carbon and theoretically pure natural uranium metal, both of the highest obtainable densities, the maximum possible K factor theoretically obtainable is about 1.1 when the uranium is aggregated with optimum geometry. Still higher K factors can be obtained by the use of aggregation in the case of uranium having more than the naturally occurring content of fissionable elements. Adding such fissionable material is termed enrichment of the uranium.

It is thus clearly apparent that the aggregation of the uranium into masses separated in the slowing material is one of the most important, if not the most important factor entering into the successful construction of a self-sustaining chain reacting system utilizing relatively pure natural uranium in a slowing material such as graphite in the best geometry at present known, and is also important in obtaining high K factors when enrichment of the uranium is used.

Somewhat higher K factors are obtainable where moderators such as deuterium oxide or beryllium are used. Thus with beryllium it is possible to secure a K factor as high as 1.10 with optimum geometry and absolute purity. Moreover with deuterium oxide K factors of about 1.27 may be obtained. When such moderators are used the problem of aggregation may be somewhat less important although it is an essential factor if maximum K factors and minimum size reactors are to be obtained.

The thermal neutrons are also subject to capture by the slowing material. While carbon and beryllium have very small capture cross-sections for thermal neutrons, and deuterium still smaller, an appreciable fraction of thermal neutrons (about 10 percent of the neutrons present in the system under best conditions with graphite) is lost by capture in the slowing material during diffusion therethrough. It is therefore desirable to have the neutrons reaching thermal energy promptly enter uranium.

In addition to the above-mentioned losses, which are inherently a part of the nuclear chain reaction process, impurities present in both the slowing material and the uranium add a very important neutron loss factor in the chain. The effectiveness of various elements as neutron absorbers varies tremendously. Certain elements such as boron, cadmium, samarium, gadolinium, and some others, if present even in a few parts per million, could prevent a self-sustaining chain reaction from taking place. It is highly important, therefore, to remove as far as possible all impurities capturing neutrons to the detriment of the chain reaction from both the slowing material and the uranium. If these impurities, solid, liquid, or gaseous, and in elemental or combined form, are present in too great quantity, in the uranium bodies or the slowing material or in, or by absorption from, the free spaces of the system, the self-sustaining chain reaction cannot be attained. The amounts of impurities that may be permitted in a system, vary with a number of factors, such as the specific geometry of the system, and the form in which the uranium is used—that is, whether natural or enriched, whether as metal or oxide—and also factors such as the weight ratios between the uranium and the slowing down material, and the type of slowing down or moderating material used—for example, whether deuterium, graphite or beryllium. Although all of these considerations influence the actual permissible amount of each impurity material, it has fortunately been found that, in general, the effect of any given impurity or impurities can be correlated directly with the weight of the impurity present and with the K factor of the system, so that knowing the K factor for a given geometry and composition, the permissible amounts of particular impurities can be readily computed without taking individual account of the specific considerations named above. Different impurities are found to affect the operation to widely different extents; for example, relatively considerable quantities of elements such as hydrogen may be present, and, as previously suggested, the uranium may be in the form of oxide, such as $UO_2$ or $U_3O_8$, or carbide, although the metal is preferred. Nitrogen may be present to some extent, and its effect on the chain reaction is such that the neutron reproduction ratio of the system may be changed by changes in atmospheric pressure. This effect may be eliminated by enclosing or evacuating the system if desired, or may be utilized by determining changes in a particular system in the reproduction ratio as changes occur in the atmospheric pressure. A sensitive barometer is thus obtained. In general, the inclusion of combined nitrogen is to be avoided.

The effect of impurities on the optimum reproduction factor K may be conveniently evaluated to a good approximation, simply by means of certain constants known as "danger coefficients" which are assigned to the various elements. These danger coefficients for the impurities are each multiplied by the percent by weight of the corresponding impurity, and the total sum of these products gives a value known as the total danger sum. This total danger sum is subtracted from the reproduction factor K as calculated for pure materials and for the specific geometry under consideration.

The danger coefficients are defined in terms of the ratio of the weight of impurity per unit mass of uranium and are based on the cross section for absorption of thermal neutrons of the various elements. These values may be obtained from physics textbooks on the subject and the danger coefficient computed by the formula $$\frac{\sigma_i}{\sigma_u} \cdot \frac{A_u}{A_i}$$

wherein $\sigma_i$ represents the cross section for the impurity and $\sigma_u$ the cross section for the uranium, $A_i$ the atomic weight of the impurity and $A_u$ the atomic weight for uranium. If the impurities are in the carbon, they are computed as their percent of the weight of the uranium of the system.

Presently known values for danger coefficients for some elements are given in the following table, wherein the elements are assumed to have their natural isotopic constitution unless otherwise indicated, and are conveniently listed according to their chemical symbols:

| Element: | Danger coefficient |
|---|---|
| He | 0 |
| Li | 310 |
| B | 2150 |
| N | 4.0 |
| F | 0.02 |
| Na | 0.65 |
| Mg | 0.48 |
| Al | 0.30 |
| Si | 0.26 |
| P | 0.3 |
| S | 0.46 |
| Cl | 31 |
| K | 2.1 |
| Ca | 0.37 |
| Ti | 3.8 |
| V | 4 |
| Cr | 2 |
| Mn | 7.5 |
| Fe | 1.5 |
| Co | 17 |
| Ni | 3 |
| Cu | 1.8 |
| Zn | 0.61 |
| Ga | ~1 |
| As | 2 |
| Se | 6.3 |
| Br | 2.5 |
| Rh | 50 |
| Ag | 18 |
| Cd | 870 |
| In | 54.2 |
| Sn | 0.18 |
| Sb | 1.6 |
| I | 1.6 |
| Ba | 0.30 |
| Sm | ~1430 |
| Eu | 435 |
| Gd | ~6320 |
| Pb | 0.03 |
| Bi | 0.0025 |
| Th | 1.1 |

Where an element is necessarily used in an active part of a system, it is still to be considered as an impurity; for example, in a structure where the uranium bodies consist of uranium oxide, the actual factor K would ordinarily be computed by taking that fact into account using as a base K a value computed for theoretically pure uranium.

As a specific example, if the materials of the system under consideration have .0001 part by weight of Co and Ag, the total danger sum in K units for such an analysis would be:

$$.0001 \times 17 + .0001 \times 18 = .0035 \ K \text{ units}$$

This would be a rather unimportant reduction in the reproduction factor K unless the reproduction factor for a given system, without considering any impurities, is very nearly unity. If, on the other hand, the impurities in the uranium in the previous example had been Li, Co, and Rh, the total danger sum would be:

$$.0310 + .0017 + .0050 = .0377 \ K \text{ units}$$

This latter reduction in the reproduction factor for a given system would be serious and might well reduce the reproduction factor below unity for certain geometries and certain moderators so as to make it impossible to effect a self-sustaining chain reaction with natural uranium and graphite, but might still be permissible when using enriched uranium in a system having a high K factor.

This strong absorbing action of some elements renders a self-sustaining chain reacting system capable of control. By introducing neutron absorbing elements in the form of rods or sheets into the interior of the system, for instance in the slowing material between the uranium masses, the neutron reproduction ratio of the system can be changed in accordance with the amount of absorbing material exposed to the neutrons in the system. A sufficient mass of the absorbing material can readily be inserted into the system to reduce the reproduction ratio of the system to less than unity and thus stop the reaction. Consequently, it is another object of our invention to provide a means and method of controlling the chain reaction in a self-sustaining system.

When the uranium and the slowing material are of such purity and the uranium is so aggregated that fewer neutrons are parasitically absorbed than are gained by fission, the uranium will support a chain reaction producing an exponential rise in neutron density if the overall size of the system is sufficiently large to overcome the loss of neutrons escaping from the system. Thus the overall size is important.

The size of the system will vary, depending upon the K factor of the system, and upon other things. If the reproduction factor K is greater than unity, the number of neutrons present will increase exponentially and indefinitely, provided the structure is made sufficiently large. If, on the contrary, the structure is small, with a large surface-to-volume ratio, there will be a rate of loss of neutrons from the structure by leakage through the outer surfaces, which may overbalance the rate of neutron production inside the structure so that a chain reaction will not be self-sustaining. For each value of the reproduction factor K greater than unity, there is thus a minimum overall size of a given structure known as the critical size, above which the rate of loss of neutrons by diffusion to the walls of the structure and leakage away from the structure is less than the rate of production of neutrons within the system, thus making the chain reaction self-sustaining. The rate of diffusion of neutrons away from a large structure in which they are being created through the exterior surface thereof may be treated by mathematical analysis when the value of K and certain other constants are known, as the ratio of the exterior surface to the volume becomes less as the structure is enlarged.

In the case of a spherical structure employing uranium bodies imbedded in graphite in the geometries disclosed herein and without an external reflector the following formula gives the critical overall radius (R) in feet:

$$K-1=\frac{C}{R^2}$$

where C is a constant that varies slightly with geometry of the lattice and for normal graphite lattices may have a value close to 7.2.

For a rectangular parallelopiped structure rather than spherical, the critical size can be computed from the formula $$K-1=C\left(\frac{1}{a^2}+\frac{1}{b^2}+\frac{1}{c^2}\right)$$

where $a$, $b$, and $c$ are the lengths of the sides in feet. The critical size for a cylindrical structure is given by the formula, irrespective of the shape of the uranium bodies Cylinder height $h$ ft., radius $R$ ft. $K-1=C\left(\frac{1}{h^2}+\frac{.59}{R^2}\right)$ However, when critical size is attained, by definition no rise in neutron density can be expected. It is therefore necessary to increase the size of the structure beyond the critical size but not to the extent that the period for doubling of the neutron density is too short, as will be explained later. Reactors having a reproduction ratio $(r)$ for an operating structure with all control absorbers removed and at the temperature of operation up to about 1.005 are very easy to control. Reproduction ratio should not be permitted to rise above about 1.01 since the reaction will become difficult to control. The size at which this reproduction ratio can be obtained may be computed from modifications of the above formulae for critical size. For example, for spherical active structures the formula $$K-r=\frac{C}{R^2}$$

may be used to find R when K is known and $r$ is somewhat over unity. The same formula will, of course, give $r$ for given structures for which K and R are known.

Critical size may be attained with a somewhat smaller structure by utilizing a neutron reflecting medium surrounding the surface of the active structure. For example, a 2 foot thickness of graphite having low impurity content, completely surrounding a spherical structure is effective in reducing the diameter of the uranium bearing portion by almost 2 feet, resulting in a considerable saving of uranium or uranium compound.

The rate of production of element $94^{239}$ will depend on the rate of neutron absorption by $U^{238}$ and is also proportional to the rate at which fissions occur in $U^{235}$. This in turn is controlled by the thermal neutron density existing in the reaction while operating. Thus for maximum production of element $94^{239}$, it is essential that the thermal neutron density be at a maximum value commensurate with thermal equilibrium.

Considerable heat is generated during a neutronic reaction primarily as the result of the fission process. Following are tables showing more specifically the type of heat generated in the reactor.

SUMMARY BY TYPE

|  | M.e.v./fission | Percent |
|---|---|---|
| Gamma radiation | 18 | 9 |
| Beta radiation | 16 | 8 |
| Kinetic energy of fission fragments | 160 | 80 |
| Kinetic energy of neutrons | 6 | 3 |
|  | 200 | 100 |

SUMMARY BY LOCALE WHERE HEAT IS GENERATED

|  | M.e.v./fission | Percent |
|---|---|---|
| In uranium | 174 | 87 |
| In moderator | 16 | 8 |
| Outside pile | 10 | 5 |
|  | 200 | 100 |

SUMMARY BY TYPE AND LOCALE

|  | M.e.v./per fission | Percent in U | Percent in C | Percent Outside |
|---|---|---|---|---|
| Kinetic energy of fission fragments | 159 | 100 | | |
| Kinetic energy of neutrons | 6 | | 99 | 1 |
| Gamma radiation from fission products | 5 | 50 | 45 | 5 |
| Beta radiation from fission products | 6 | 100 | | |
| Nuclear affinity of neutrons (gamma radiation) | 12 | 70 | 25 | 5 |

When the system is operated for an extended period of time at a high production output of element $94^{239}$, the large amount of heat thus generated must be removed in order to stabilize the chain reaction. Most of the heat in an operating device is generated as the result of the nuclear fissions taking place in the $U^{235}$ isotope. Thus, the rate of heat generation is largely proportional to the rate at which the fissions take place. In other words, if the rate of generation of neutrons is increased, a greater amount of coolant must be passed through the reactor in order to remove the heat thus generated to avoid damage, particularly at the central portion of the pile, by excessive heat. Thus, the highest obtainable neutron density at which a system can be operated for an extended period of time is limited by the rate at which the generated heat can be removed. That is to say, the maximum power output of a system is limited by the capacity of the cooling system. An effective cooling system is therefore a primary requirement for high power operation of a neutronic reactor and it has been found that this cooling may be accomplished most effectively by passage of the coolant in contact with or in close proximity to the uranium.

After the neutronic system has operated for a period of time sufficient to cause a quantity of element $94^{239}$ to be produced, it may be desirable to remove at least some of the uranium rods from the reactor in order to extract element $94^{239}$ and the radioactive fission products, both being formed in the uranium rods or for other purposes. The present invention relates more particularly to the removal of uranium bodies from the neutronic reactor.

In many neutronic reactors, a neutron density variation occurs across the reactor; that is, the neutron concentration at the periphery is relatively small and increases to a maximum value at the center. Actually, therefore, since the rate of production of element $94^{239}$ is dependent upon the neutron density, the reactor will have zones which may be likened to three dimensional shells, the average concentration of element $94^{239}$ being uniform throughout any given zone. In a reactor built in the form of a sphere these would, of course, be in the shape of concentric spheres of different diameters, while one built in the shape of a cylinder would have similar zones but of different shapes.

Where this variation in concentration exists in a reactor it is often desirable to resort to a systematic schedule of removal depending upon the time of operation and the location of the uranium for removing and discharging uranium metal that has been subjected to neutron bombardment. In the case of a new system of this character the operation would normally continue until the metal in the center portion of the reactor reaches a desired content of element $94^{239}$, at which time this metal would be removed and replaced with fresh metal. The next removal then would be from the section next adjacent to the center section of the reactor where the desired content of element $94^{239}$ is reached after further operation. The process would then proceed with the removal of the metal at various times until the metal recharged at the center of the reactor has reached the desired content of element $94^{239}$. This would then be replaced and the process of progressing towards the periphery continued with periodic return to more central areas. Since the neutron density in the central areas of such a reactor would, ordinarily, greatly exceed the neutron density near the periphery, the metal in the central areas may be replaced several times for each replacement of the metal near the periphery. A removal schedule can be developed by calculation and checked by actual experience after the system has been placed in operation.

Different schedules may be developed with other reactors having different reactivity curves. For example, certain reactors are constructed in a manner such that the neutron concentration is substantially uniform throughout a large volume of the reactor. In such a case the schedule for removal of uranium bodies may be modified accordingly.

Since the heat generated in the reactor results from fissions in the uranium, it is evident that this heat is not formed uniformly throughout the reactor but that it must vary across the reactor with the local rate at which fissions occur and element $94^{239}$ formed. Consequently, the relative values for the production of element $94^{239}$ apply also to heat distribution; that is, the heat generated may increase from a minimum at the outer surface of the reactor to a maximum at the center in certain reactors.

As the total weight of the radioactive fission elements is proportional to that of the $94^{239}$ at the time of fissions, it might be assumed that the amounts of these radioactive fission elements and of $94^{239}$ present in metal removed from the reactor are also of the same proportion. This is not true, however, as the fission elements when produced are highly radioactive and immediately start to decay, some with short half lives and others with longer half lives until, through loss of energy, these unstable fission elements arrive at a stable non-radioactive element or isotope and no longer change. The $94^{239}$ on the other hand is a relatively stable element when formed, having a radioactive half life of about $2 \times 10^4$ years.

At the start of the reaction in new metal the radioactive fission elements and the $94^{239}$ both increase in amounts. After a certain period of operation during which time the metal is subjected to intense neutron bombardment the radioactive fission elements will reach a state of equilibrium and from that time on the amounts of these radioactive elements remain constant, as the fission elements with shorter half lives are reaching a stable condition at the same time new ones are being produced. The amount of the stable end products of fission, however, continues to increase with the increase in element $94^{239}$. Consequently, the rate of formation of the fission end products is dependent upon the location of any particular metal in the reactor, and the power at which the system operates controls the maximum radioactive fission element content regardless of the length of time the system operates after equilibrium occurs. The quantity of element $94^{239}$ on the other hand, and of the final and stable end products of fission continue to increase as the operation of the system continues. The amounts of both $94^{239}$ and fission end products present are controlled only by the location of the metal in the reactor and the time and power of operation. The highly radioactive fission elements may, therefore, vary from a substantial percentage of the weight of element $94^{239}$ present in the metal at the center of the reactor after a short period of operation, to a very small percentage in metal from a position near the periphery of the reactor after an extended operating period at a given power.

It is not to be assumed, however, that the fact that equilibrium can be obtained between the original highly radioactive fission elements and the stable fission end products that all radioactivity will cease when the original fission elements have been permitted to decay for a time equal to the equilibrium period, for example. Many of the original fission elements have long half lives that, taken together with their successive radioactive disintegration products existing long after the fission elements having a shorter half life have decayed, renders the uranium still radioactive especially after prolonged bombardment at high neutron densities. In addition, the successive radioactive disintegration products of the original shorter lived fission elements may still be present.

The equilibrium radioactivity is so intense that metal taken from the reactor for the recovery of element $94^{239}$ and fission products immediately after bombardment at high neutron densities will heat spontaneously due to self absorption of the intense radioactivity of the remaining radioactive fission products. The amount of heat generated as the result of the spontaneous heating will depend particularly on three factors: (1) the concentration of element $94^{239}$ and fission products in the metal; (2) the period of time for continuous operation required to reach this concentration; and (3) the elapsed time since the reactor was shut down and the metal was removed.

The metal from the center of the reactor in a system operating at a high power output, for example, at a $94^{239}$ concentration of 1 to 2,000, if not cooled, can increase in temperature at the rate of about 2000° C. per hour one day after the neutron activity of the system has been shut down. After 30 days shut down following an operation of 100 days at an output of 500,000 kilowatts, the average temperature rise can be approximately 572° C. per hour. The uranium metal of the type used in the chain reacting systems herein under consideration melts at about 1100° C.

Under these conditions uranium bombarded with neutrons for an extended period of time at high rates of power output can be safely removed from the reactor under one of the following methods:

(1) The neutron activity of the system is shut down and the uranium is kept in the reactor and continuously cooled until the radioactivity decays to a point where the metal can be removed without melting in ambient air. This procedure may require that the metal remain in the reactor for a period of from 30 to 50 days after the neutron bombardment has ceased.

(2) The neutron activity of the system is shut down and the uranium is kept in the reactor with the cooling system in operation for only a few days to permit the most violent radioactivity to subside and then the metal is removed from the reactor with the cooling discontinued during the removal except for cooling by the atmosphere or by water spray. The metal is then promptly placed under more efficient cooling conditions before the temperature of the uranium has become excessive.

(3) The neutron activity of the system is shut down and the uranium is removed while cooling the uranium body at least to an extent sufficient to prevent the temperature from become excessive. This modification of the present invention is particularly effective.

It is also important, of course, from the point of view of biological safety of operating personnel that adequate shielding be provided to absorb the strong gamma radiations from the fission products present in the active uranium while being removed from the reactor. The neutron activity in the reactor completely ceases within 30 minutes after shut down of the neutronic reaction during which period delayed neutrons are being emitted. In no case then should the uranium be removed from the reactor immediately following shut down of the neutronic reaction, but sufficient time should be given to permit all delayed neutrons to be emitted. Thus, the shielding required during the removal of the uranium rods from the system is primarily intended to protect personnel from gamma radiations. As stated above, immediately following shut down of the neutronic reaction, there are many short lived radioactive fission elements in the uranium causing the gamma radiation to be very intense. Many of these elements decay into more stable products within the first thirty minutes following shut down of the reaction. Thus, the fission products lose a large amount of their radioactivity during this period.

While the method of extracting the fission products and element $94^{239}$ from the bombarded uranium taken from the reactor forms no part of the present invention, the fission products and element $94^{239}$ are removable and when removed are extremely useful. The radioactive fission products are valuable for use as radiation sources, many having long half lives with high energy gamma radiation sufficient for radiography of even heavy metal castings. In addition, some of the fission products are useful as radioactive tracers in biological and physiological research and are in demand by the medical profession.

Element $94^{239}$ is exceptionally useful because it is fissionable by slow neutrons in the same manner as the uranium isotope $92^{235}$ contained in natural uranium. The separation of $92^{235}$ from $92^{238}$ in natural uranium is extremely difficult since both are isotopes of the same element and these isotopes vary only a small percentage in comparative weight. Element $94^{239}$ on the other hand, is a different element from uranium, having different chemical properties than uranium, and therefore can be chemically separated from uranium. After separation, for example, element $94^{239}$ can be added to natural uranium to supplement the $92^{235}$ content, thus increasing the amount of fissionable material in the uranium. This enriched uranium can then be used in neutronic systems making it possible to provide more cooling facilities, for example, than can be used in a system of the same geometry employing only natural uranium. Thus, an enriched neutronic system may provide a greater power output than would be possible in a natural uranium system having the same geometry.

It should be understood that the subject matter above discussed does not constitute in itself the teaching of the present invention. The present invention is not concerned with such criteria for operativeness of a reactor as purity and amount of the fissionable material, purity and amount of the moderator, or the exact mode or manner of disposition of the fissionable material in the moderator to produce a chain reaction. Such criteria for operativeness of the neutronic reactor are not the invention of the present inventors, and are set forth in copending applications of other inventors, notably the copending application of Fermi and Szilard, Serial No. 568,904, filed December 19, 1944, now Patent No. 2,708,656, dated May 17, 1955.

To summarize the present invention is concerned with the unloading and loading of a liquid cooled neutronic reactor particularly after it has operated for a substantial period of time. Uranium or similar fissionable material which has been subjected to neutron bombardment is highly radioactive. The present invention provides means for removing such highly radioactive material without hazard to personnel. If the uranium or other fissionable material has been operated under conditions such that substantial heat has been evolved the problem of removing the product is made more difficult due to the "self heating" phenomenon which occurs after neutronic reaction has been discontinued. We have found that this difficulty may be overcome to a substantial degree by cooling the fissionable composition during its removal, and thereafter cooling this composition immediately after its removal from the reactor until this self heating has substantially discontinued. Further we have found that the degree and period of cooling required in each case may be decreased by cooling the fissionable composition in the reactor after the reactor has been shut down and the self-sustaining chain reaction discontinued. If such precooling is continued for several days cooling during removal may be dispensed with and if the precooling is continued for a long period of time for example 30 days or more cooling after removal may not be required. Apparatus suitable for performance of the above process has been provided in accordance with this invention. Particularly valuable modifications have been provided to permit removal of the fissionable bodies without shutting down the reactor for long periods of time.

The foregoing constitute some of the principal objects and advantages of the present invention, others of which will become apparent from the following description read in conjunction with the drawings, in which Fig. 1 is a diagrammatic view of a preferred embodiment of the present invention showing horizontally disposed tubes in a graphite moderator and further illustrating a water filled chute into which uranium rods are ejected;

Fig. 2 is a diagrammatic view of a second embodiment of the present invention similar to Fig. 1 but showing the tubes disposed vertically in the graphite moderator;

Fig. 3 is a diagrammatic view of a third embodiment of the present invention showing tubes arranged horizontally in a graphite moderator and further illustrating shielded cars for charging and discharging uranium rods into and from the reactor;

Fig. 4 is a schematic diagram showing the external circulating system for the coolant;

Fig. 12 is an enlarged fragmentary detailed sectional view corresponding to Fig. 11 but showing in particular the valve arrangement at the loading end of the reactor;

Fig. 13 is an enlarged transverse sectional view through one of the horizontal tubes in the reactor showing a uranium rod in position at the top with the cooling water film filling the space between the rod and the walls of the tube, the view further showing portions of the graphite moderator surrounding the tube;

Fig. 14 is a fragmentary vertical view through the reactor shown partially in section and partially in elevation;

Fig. 15 is a vertical sectional view taken on the line 15—15 of Fig. 14;

Fig. 16 is an enlarged end elevational view at the emerging end of one of the horizontal tubes showing the rod retainer in closed position;

Fig. 24 is a schematic line diagram of a control system for the neutron reactor, the electrical circuit operating this control system being reduced to lowest terms for purposes of illustration;

Fig. 25 is a diagrammatic view of the reactor showing a circuit for the helium in the reactor;

Fig. 26 is a transverse sectional view through a modified form of assembly of uranium, aluminum, and coolant;

Fig. 27 is a sectional view corresponding to Fig. 26 but showing a second modification;

Fig. 28 is a sectional view corresponding to Fig. 26 but showing still another modified arrangement;

Fig. 29 is a sectional view corresponding to Fig. 26 but showing a fourth modification; and Fig. 30 is an enlarged fragmentary perspective view of the graphite blocks employed in the reactor showing one uranium rod and tube in position.

GENERAL ORGANIZATION

Figure 5:
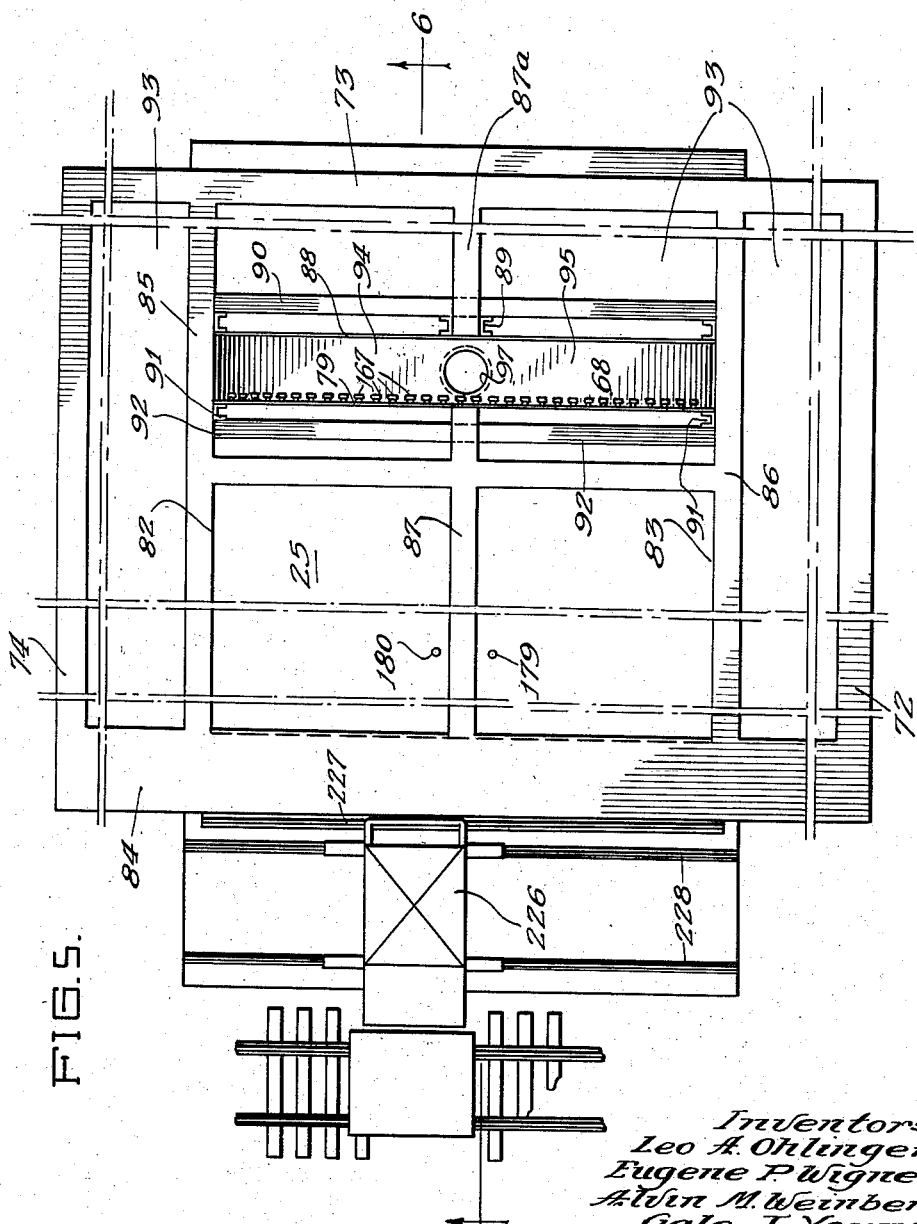
Fig. 5 is a plan view of the power unit forming the preferred embodiment of the invention.

An entire neutronic system accomplishing the objects hereinbefore set forth comprises broadly a power unit including a neutronic reactor, a complete heat extracting or cooling circuit adapted to remove from the reactor heat generated as a result of the neutronic reaction, an effective control system regulating the operation of the neutronic reaction to conform to selected conditions of operation, and provisions for loading bodies containing fissionable material into the reactor and discharging the bodies from the reactor after they have been subjected to neutron bombardment for a predetermined period of time.

The reactor forming a part of the power plant can be one of a variety of types and for purposes of illustration, one employing uranium rods disposed in graphite has been selected.

Referring to Figs. 1 to 3 inclusive, three embodiments of the present invention are diagrammatically shown. In Fig. 1, the reactor is generally indicated at 25 and comprises broadly a graphite portion 26 serving as the moderator and a plurality of horizontally disposed tubes 27 extending throughout the width of the graphite. Uranium rods are disposed in the tubes 27 as will be brought out hereinafter and these rods are adapted to be discharged into a vertical chute 28 filled with water 29 and discharging at its lower end into a shielded receptacle 30 mounted on a car generally indicated at 31. This embodiment of the invention will be illustrated more completely hereinafter.

Referring to Fig. 2, a second form of the invention is shown wherein the tubes 27 are disposed vertically in the graphite 26. In this form of the invention, the uranium rods are discharged from the tubes 27 into a chute 32 positioned underneath the reactor 25. This chute 32 discharges into the waiting shielded receptacle 30.

A third embodiment of the invention is illustrated in Fig. 3. In this form the tubes 27 are again disposed horizontally in the graphite 26. Uranium rods, not shown, are fed from a car 35 disposed adjacent to one side of the reactor 25 into the tubes 27 and the active uranium rods are ejected from the tubes 27 at the opposite side of the reactor 25 into a waiting shielded car generally indicated at 36. This shielded car 36 is filled with water and some means for constantly replenishing this water is provided.

The cooling circuit

Irrespective of the form the reactor may take, the power may be extracted by circulating a coolant through the reactor in heat exchange relationship with the uranium rods. If the power unit is located near a relatively pure body of water such as a river of sufficient size to supply the necessary quantity of water to extract the required amount of heat, then this river water can be passed through the reactor after first being processed to obtain the required purity. Under these conditions the water after passing through the reactor is returned to the river.

In the event a natural body of water is not available, then a supply of coolant must be provided. In this event, it is desirable to recirculate the coolant through the reactor many times and thus reduce to a minimum the total quantity required. The coolant leaving the reactor may carry with it certain free gases such as hydrogen and oxygen if water is used, which should be eliminated from the cooling circuit. For this purpose, the coolant leaving the reactor is passed through a flash tank where these gases are removed. The coolant is then cooled and finally pumped back through the reactor and recirculated.

For purposes of illustration an external circulating system for the coolant is shown in Fig. 4, wherein water, as the coolant, after passing through the reactor 25 and extracting heat, is treated and filtered and then passed in heat exchange relationship with a secondary coolant and finally is recirculated through the reactor.

In Fig. 4, the reactor is diagrammatically shown at 25, the water inlet header being illustrated at 40. The cooling water is discharged from the reactor into the vertical chute 28 and then enters the pipe 41 through which it is conveyed by pump 41b to a flash tank 42, after passing through a throttling valve 41a. The water leaves the flash tank 42 through pipe 43, passes through heat exchanger 44 where it is cooled by flowing in heat exchange relationship with a cooler liquid, and then flows through pipe 45 and is returned to the reactor 25 by the pump 46 through pipe 47.

The water entering the heat exchanger 44 has a temperature only slightly less than the boiling point at the existing pressure. The water leaving the heat exchanger 44 has a temperature of about 95° F., this cooling being accomplished by transferring the heat to the cooler fluid in a secondary cooling system.

This secondary system includes a cooling tower generally indicated at 54, a pump 55, the heat exchanger 44 and suitable piping 56. The cooling fluid in the cooling tower 54, and for purposes of illustration water has been selected for this fluid, is collected in a reservoir 57 at the bottom of the tower from which the water is withdrawn by pump 55 and passed to the heat exchanger 44. This water entering the heat exchanger 44 is at a temperature of about 85° F. and leaves the heat exchanger at a temperature of about 130° F. This hot water passes through pipe 56 into spray head 58 disposed adjacent to the top of the cooling tower 54. The hot water is sprayed in a fine mist into the cooling tower 54, and mixes with air circulated through the cooling tower by a blower 59. Evaporation takes place resulting in the cooling of the water in the cooling tower 54 so that the water collected in the reservoir 57 has been effectively cooled by this process of evaporation. Losses due to vaporization may be replaced as will be understood in the art. Louvered openings 60 are provided in a wall of the cooling tower 54 through which air is discharged.

A portion of the cold water leaving pump 55 is by-passed from the secondary cooling system through a pipe 62 feeding condenser coils 52 and is returned to the secondary cooling system through pipe 63.

For purposes of illustration, distilled water is used in both cooling circuits and conventional means (not shown) may be provided for replenishing water lost by evaporation or leakage. Inhibitors may be added to the water to reduce the corrosive effect on the metal in the system. A mixture of potassium or ammonium phosphate and silicate is satisfactory for this purpose.

The entire primary water circulating system is provided with radiation shielding to protect personnel from the harmful effects of gamma radiations. As shown, the flash tank 42 is surrounded by a cylindrical concrete wall 64 extending above the top of the flash tank 42 and forming an enclosure which is completely filled with water. A similar wall 65 surrounds the heat exchanger 44 and the tank formed thereby likewise is filled with water.

For purposes of illustration only a diagrammatic showing is made at 66 of a shield surrounding the reactor 25. More complete details of this latter shield are brought out elsewhere. Similarly a diagrammatic showing of a shield surrounding the pump 46 is illustrated at 67.

*The power unit*

Figure 6:
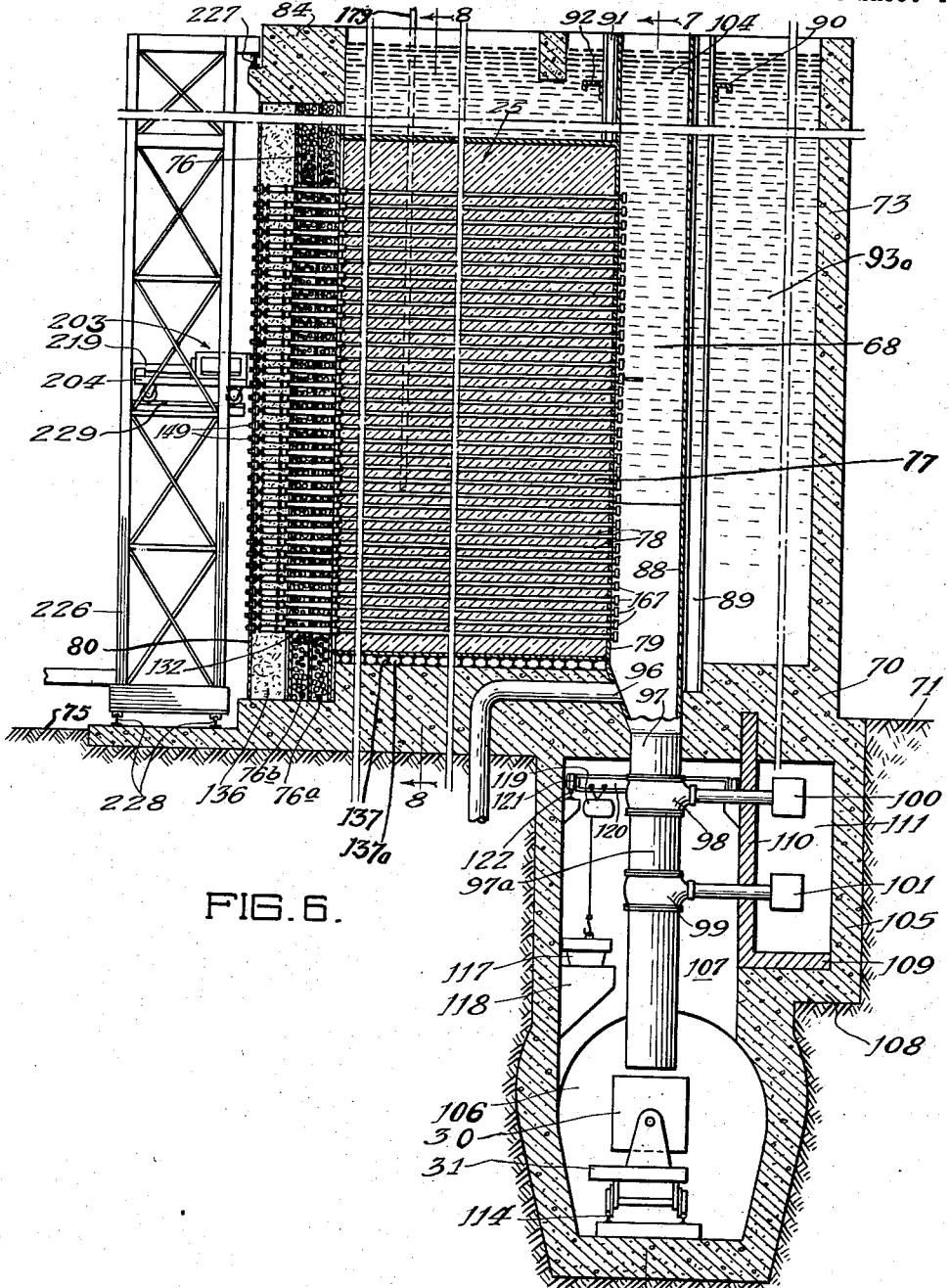
Fig. 6 is a vertical sectional view taken on the line 6—6 of Fig. 5, the view being shown partially in elevation.
Figure 7:
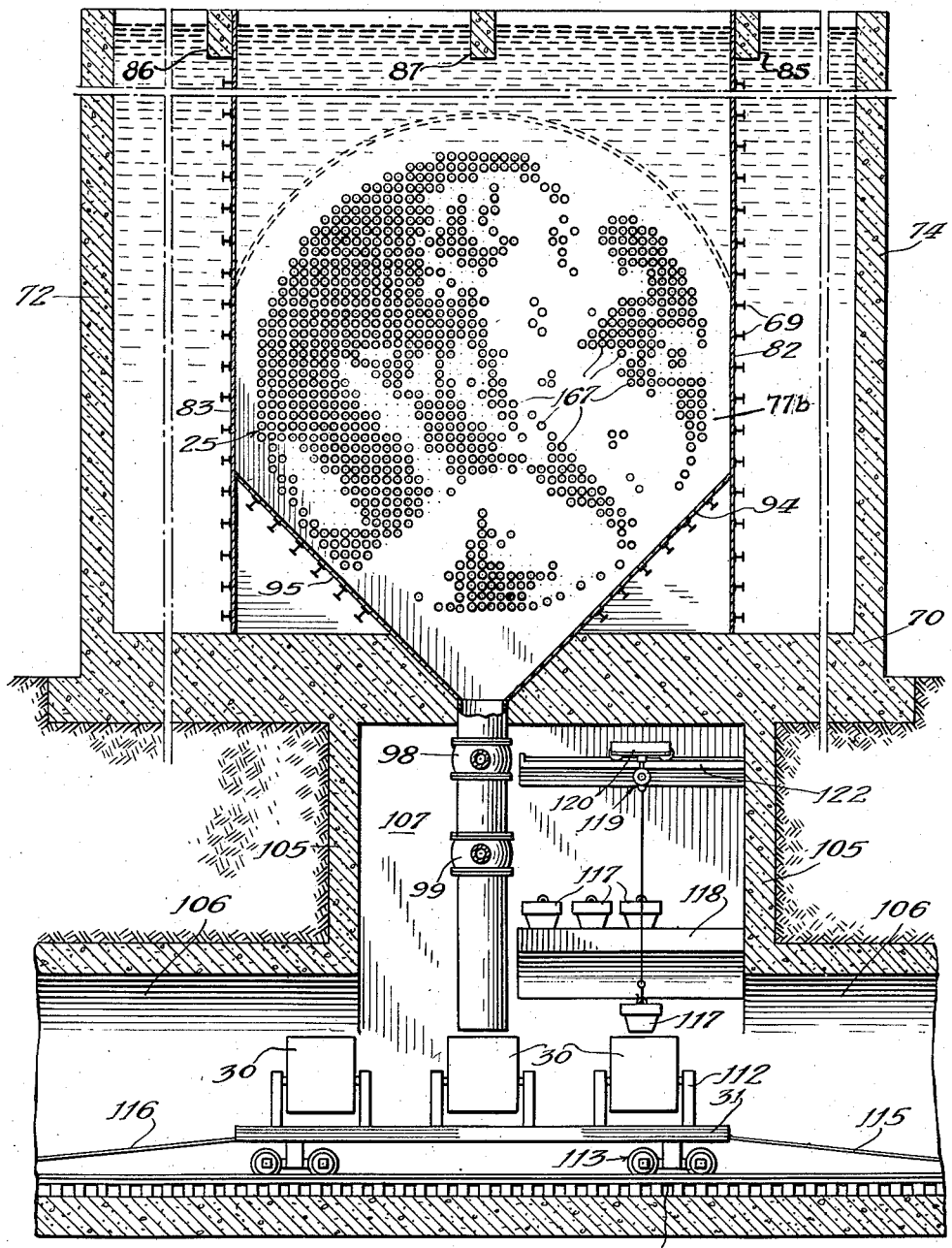
Fig. 7 is a vertical sectional view taken on the line 7—7 of Fig. 6, the view being shown partially in elevation.

Since energy is extracted in the form of heat, the source of the heat may be termed the power unit. Referring to Figs. 5 to 7 inclusive, the power unit, including the reactor 25, is shown. The reactor 25 is mounted on a concrete base 70 resting on the ground 75. Upstanding walls 72, 73 and 74 are disposed on three sides of the reactor 25, extending upwardly from the base 70 to a position substantially above the top of the reactor 25. The fourth side of the reactor 25 is enclosed by a steel shot and water shield, generally indicated at 76 and forming the fourth side of a large tank.

Referring particularly to Figs. 6 and 7, the reactor 25 comprises a graphite moderator 77 in the form of a horizontally disposed cylinder through which are arranged a plurality of horizontally disposed parallel tubes 78, this entire assembly being surrounded by a graphite reflector 77b of about 50 centimeters in thickness. As shown in Fig. 7, the tubes 78, which are capped by caps 167, are arranged in a square geometry (i.e. in uniformly spaced vertical and horizontal rows) throughout the cross sectional area of the graphite moderator 77.

The graphite moderator 77 may be built of graphite blocks 77a (Fig. 30) cut to a size convenient for handling. The tubes 78 may be disposed in holes drilled through the graphite blocks that are aligned to form continuous channels or passages throughout the length of the cylindrical graphite moderator 77.

The reactor 25 is enclosed in a gas tight shell comprising two steel end sheets 79 and 80, a steel side sheet 81 (see Fig. 8) and a steel bottom sheet 81a all welded together.

Spanning the distance between the concrete walls 72 and 74 at the front of the reactor 25 is a concrete beam 84 disposed above the shot and water shield 76. A pair of spacing beams 85 and 86 extend from beam 84 to the rear upstanding concrete wall 73. An intermediate spacing beam 87 extends from the beam 84 to the steel sheet 79.

Spaced from the sheet 79 is a parallel sheet 88 and extending from this sheet to the concrete wall 73 is an extension 87a (see Fig. 5) of the intermediate spacing beam 87. Two reinforcing channel members 89 extend from the concrete base 70 to the plane of the top edges of the concrete walls 72, 73 and 74 and the sheet 88 is fastened to these channel members and is reinforced thereby. A horizontally disposed channel beam 90 is fastened to the upstanding channel members 89 and serves as additional support for the spacing beams 85, 86 and 87a. Spaced apart, upstanding sheets 82 and 83 together with sheets 79 and 88 form the sides of a tank 68 at the discharge ends of the tubes 78.

A plurality of upstanding vertical channel backing members 91 reinforces the sheet 79 in the region above the reactor 25. The horizontally disposed channel beam 92 is fastened to the channel members 91 and serves as additional support for the horizontal spacing beams 85, 86 and 87.

Figure 8:
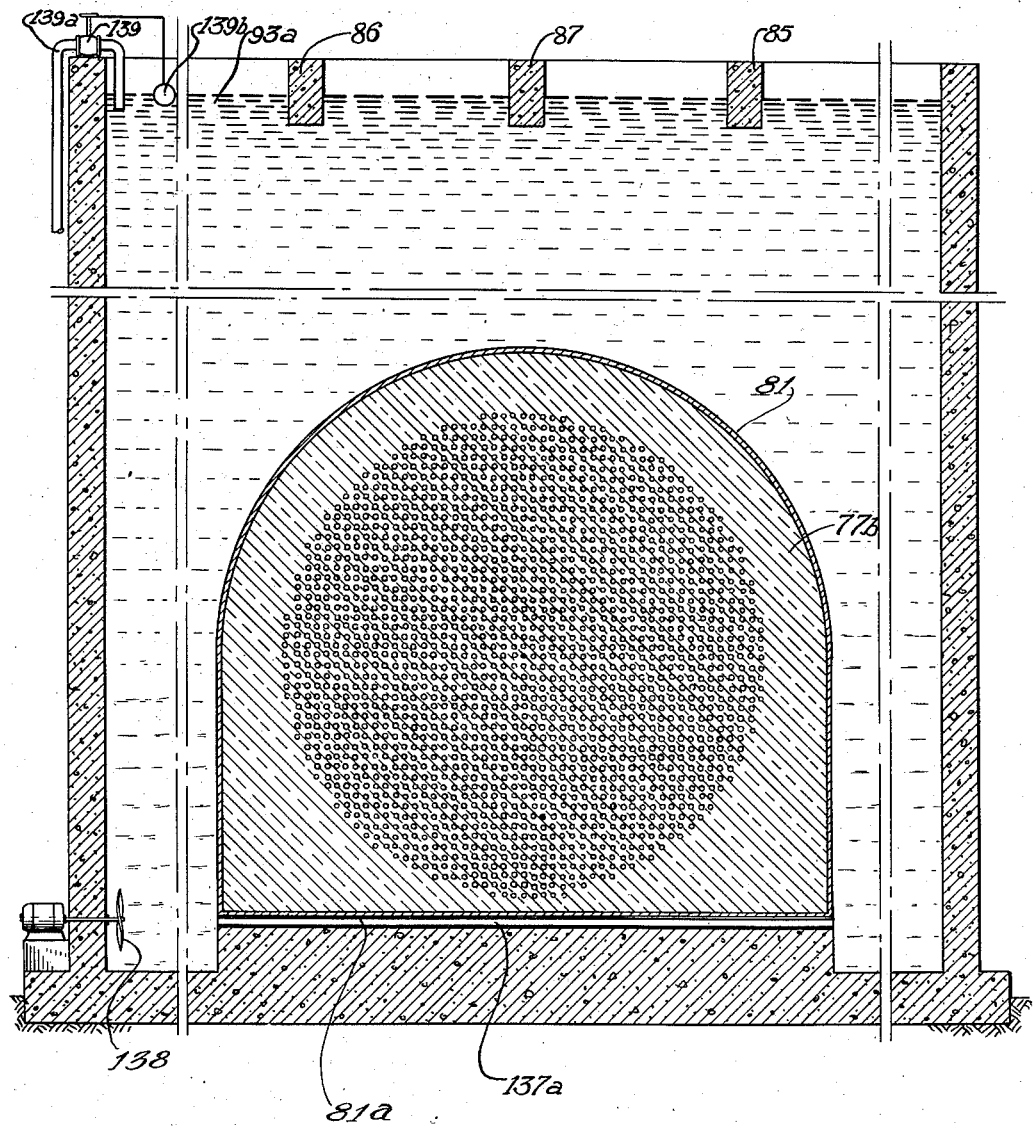
Fig. 8 is a vertical sectional view taken on the line 8—8 of Fig. 6.
Figure 9:
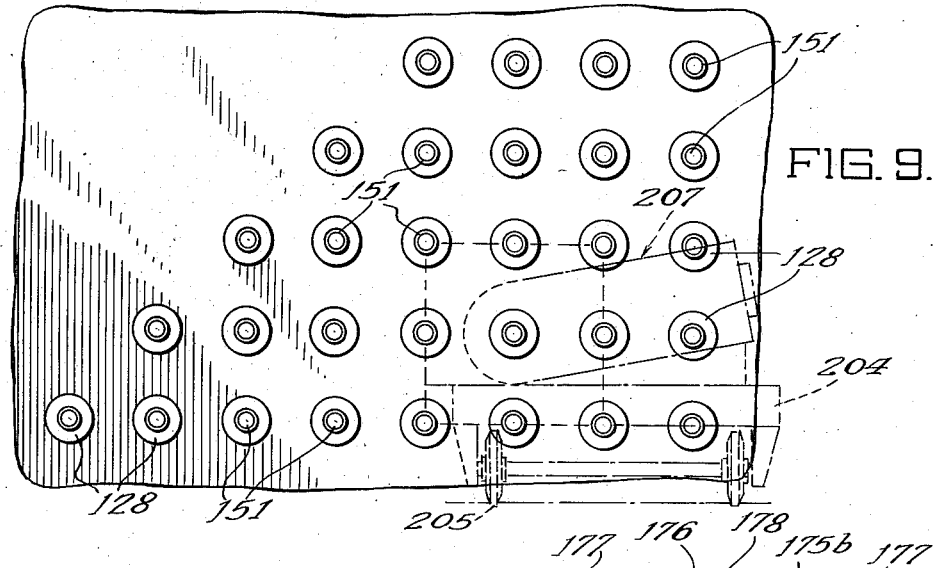
Fig. 9 is an enlarged fragmentary front elevational view showing the ends of the tubes at the loading end of the reactor.

As shown in Fig. 5, the steel sheets 82, 83 and 88 form three sides of a box-like enclosure spaced from the concrete walls 72, 73 and 74 so as to provide a shield 93 in the form of a tank surrounding the three sides of this box-like enclosure. Water indicated at 93a in Fig. 6, fills this tank forming part of the shield 93. Thus, except for the front face, the reactor 25 is immersed in water as best shown in Fig. 8.

Reactor 25 is supported on a plurality of spaced stringers 137 in the form of I-beams resting at their ends on concrete. Between the stringers 137 are a plurality of passages 137a (see Fig. 6) through which water 93a is circulated by a motor driven propeller 138 (Fig. 8). As shown in Fig. 8, the level of the water 93a above the reactor 25 is maintained at a selected position by an automatically controlled valve 139 in water supply pipe 139a. A float 139b in the water 93a controls the valve 139 in any one of several well known manners.

Projecting downward from the sheets 82 and 83 are walls 94 and 95 secured along one side to sheet 88 (Fig. 6) and along the other side to sheet 79. A plurality of I-beams are spaced throughout the extent of the sheets 82 and 83 and the diagonal walls 94 and 95 for reinforcement (see Fig. 7). The sheet 79 adjacent to its bottom is sloped toward the rear sheet 88 and together with the indicated walls 94 and 95 and the rear sheet 88 form a funnel-like portion merging into a vertical discharge chute 97 that projects downwardly below the concrete base 70. This discharge chute 97 is provided with a pair of gate valves 98 and 99 having operating means generally indicated at 100 and 101, respectively. The vertical chute 97 is open at the bottom and directly below the opening is the car 31 supporting the container 30 for receiving materials discharged from the vertical chute 97.

The tank 68 that merges into the vertical chute 97 is filled with water, the upper level 104 of which is approximately adjacent to the tops of the concrete walls 72, 73 and 74.

As previously mentioned, the chute 97 projects through the concrete base 70 to a position below the ground level 71. Concrete walls 105 (Figs. 6 and 7) project downwardly below the concrete base 70 and form a discharge chamber generally indicated at 107 communicating with a tunnel 106. As best shown in Fig. 6, the walls 105 are so formed as to provide an off-set portion or floor 108 on which is mounted a lead angle member 109 having upstanding flange 110 anchored in the concrete base 70. The flange 110 forms one wall of a room 111. The other walls of the room 111 are formed by the concrete walls 105 and the ceiling is formed by the concrete base 70. This lead angle member 109 is of sufficient thickness to provide adequate shielding to protect personnel who may be located in room 111 from the harmful effects of radioactive radiations emanating from fission products discharged through the vertical chute 97. The concrete base 70 is of sufficient thickness to absorb any neutrons directed towards the room 111 from the reactor 25.

The container 30 is mounted on the car 31 by means of a cradle 112 and as shown in Fig. 7; three such containers are thus carried on each car 31. Car 31 is mounted on wheeled trucks 113 that operate on rails 114 and a cable 115 is attached to one end of the car from pulling the car in one direction through tunnel 106. Cable 116 is attached to the opposite end of the car for pulling the car in the opposite direction through tunnel 106. Each container 30 is provided with thick lead walls, not shown, adapted to absorb gamma radiations, and lead cover 117 fits in an opening, not shown, in the top of each container. A shelf 118 is mounted on one of the walls 105 on which are placed the covers 117 for the containers 30. A conventional overhead crane is diagrammatically shown at 119 and is mounted on a movable track 120. The movable track 120 is provided with wheels 121 at each end; these in turn are mounted on fixed tracks 122.

Referring to Fig. 14, the arrangement of the tubes 78 in the graphite moderator 77 is clearly illustrated. The moderator 77 is broken away so that only a fragment of the graphite is illustrated but the tubes 78 extend throughout the entire length of the cylindrical graphite moderator 77. These tubes terminate adjacent to the sheet 79 and at the opposite side of the graphite 77 project through the sheet 129, the shield generally indicated at 76, and finally through a chamber 123 terminating after passing through front wall 124 of the power unit. A cylindrical sleeve 125 surrounds the tube 78 in the region from the graphite reactor 77 to the chamber 123 and a second sleeve 126 surrounds the portion of the tube passing through the chamber 123. Sleeve 126 is threaded on to the end of sleeve 125. A gate valve 127 is disposed on the tube 78 adjacent to the inner face of the front wall 124 of the power plant. A washer 128 is mounted on the free end of the tube 78 and against the outer face of wall 124.

The shield 76 comprises a plurality of tanks formed by spaced inner and outer walls 129 and 130 and intermediate wall or partition 131. A sleeve 132 in the form of a truncated cone surrounds each of the sleeves 125 and is welded to the walls 129, 130 and 131. Lead or iron shot 133 together with water indicated at 134 are contained in the shields 76. A tube sheet 135 is disposed against the shield wall 130 and is perforated to receive the tubes 78 with their surrounding sleeves 125. This tube sheet 135 together with the front wall 124 of the power unit form two walls of the chamber 123. Lead wool or shot 136 fills this chamber 123.

Water system in reactor

As shown in Fig. 13, the tubes 78 are adapted to receive uranium rods 140 and are provided with internal longitudinally disposed ribs 141. These ribs 141 support and center the uranium rods 140 and properly space them from the walls of the tube 78 so as to form passages 142 through which cooling medium passes.

Figure 11:
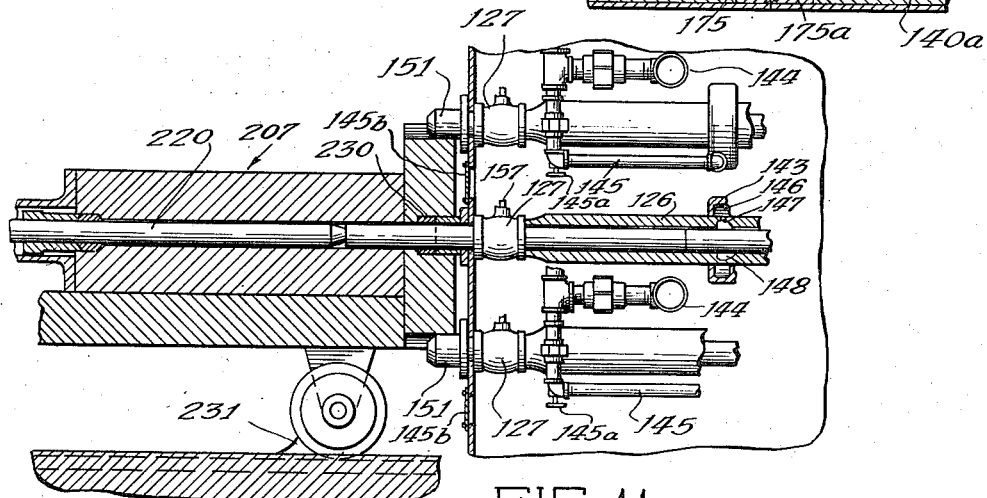
Fig. 11 is an enlarged fragmentary view at the loading end of the reactor showing partially in section and partially in elevation, the relationship between the uranium rod loading car and the horizontally disposed tubes in the reactor during the loading of uranium rods into the reactor.

Referring to Figs. 11, 12, and 14, a ring header 143 is provided around each of the sleeves 126 and these headers 143 are supplied with a liquid coolant from header pipes 144 through a piping system generally indicated at 145. The ring header 143 (see Fig. 12) has an annular passage 146 into which the coolant is fed from the piping system 145 (see Fig. 14). The sleeve 126, in turn, is provided with a plurality of passages 147 feeding from the annular passage 146 into a clearance space 148 from which the coolant passes into the tubes 78 and flows in the direction left to right in Fig. 14. This water passing through the tubes 78 discharges through the open ends of tubes 78 into the water filled tank 68 (Fig. 6). Thus, the ends of the tubes 78 adjacent to the coolant inlet headers 143 will hereinafter be designated the inlet ends of the tubes, whereas the opposite ends will be designated the outlet or discharge ends of the tubes.

At the inlet end each of the tubes 78 is provided with a plug 149, best shown in Fig. 12, provided with a shank portion 150 adapted to fit inside the end of the tube and a cap portion 151. The shank portion 150 should be of a material such as lead of adequate thickness to absorb neutrons and gamma rays directed through the tube from the interior of the reactor.

Each of the valves 127 comprises a valve casing 152 housing a movable valve member 153 fastened to a valve stem 154 projecting upwardly from the movable valve member 153 through a passage 155 in an upstanding boss 156.

The upper end of the valve stem 154 is threaded as shown at 157 to receive a bevelled gear 158 rotatably supported and held against axial displacement on the top of the boss 156 by means of an intermediate collar 159 and on a flange of an angular bracket 160. The bevelled gear 158 is adapted to rotate about the valve stem 154 and while so doing moves the stem upwardly or downwardly due to the interaction between the threaded portion 157 of the valve stem 154 and the threaded bore of the bevelled gear 158. Thus, by rotation of bevelled gear 158 the movable valve member 153 is moved upwardly or downwardly to open or close the passage through the valve housing 127.

As shown in Fig. 12, an electric motor 161 is provided for operating each of the valves 127. Each motor 161 is drivingly connected to a shaft 162 journalled in the upstanding flange of the annular bracket 160 and has on its free end a bevelled gear 163 meshing with bevelled gear 158 to rotate bevelled gear 158 in response to the operation of the motor 161. A conventional electric control system, not shown, operates the motor 161. A casing 174 encloses the assembly operating the valve 153; i.e., the motor 161, shaft 162, gears 158 and 163, and the related parts and supports the motor 161.

Figure 18:
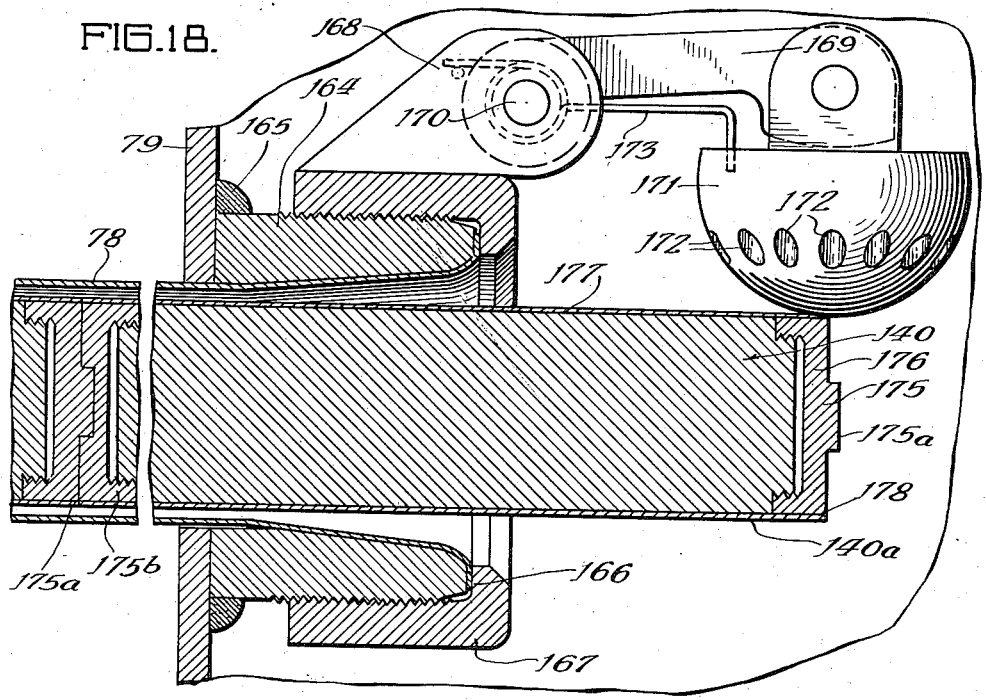
Fig. 18 is a view corresponding to Fig. 17 but showing a uranium rod projecting from the end of the tube with the retainer held in open position by the rod.

At the discharge end each tube 78 passes through sheet 79, and then terminates. As shown in Fig. 18, sleeves 164 are welded or otherwise secured as at 165 to the sheet 79. Each tube 78 passes through a sleeve 164. The sleeve 164 is threaded on its peripheral face to receive a cap 167. It is important that water 104 is not permitted to pass between the tube 78 and the sleeve 164 and for this reason each tube 78 is flanged at its end at 166 over the outer edge of the sleeve 164, and cap 167 applies a pressure seal against this flange 166 of tube 78.

Figure 17:
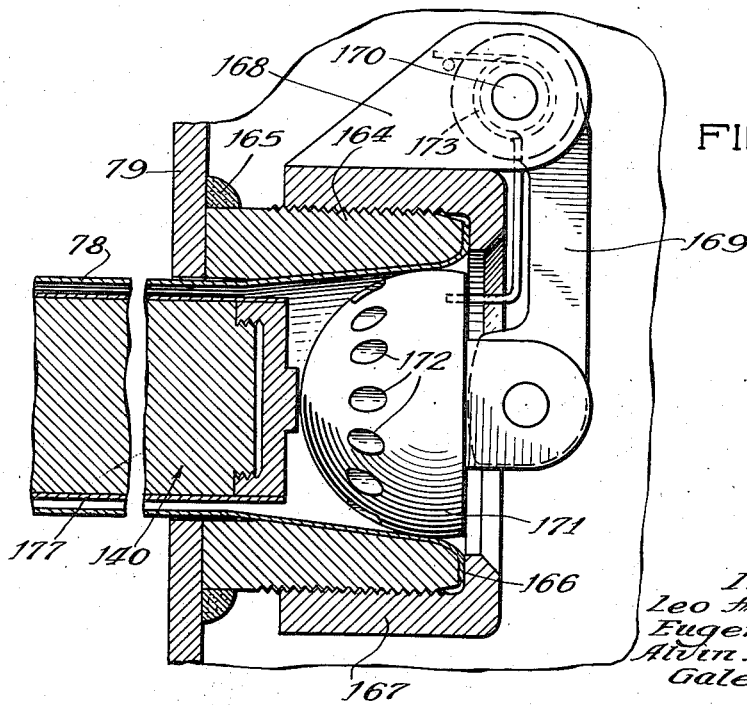
Fig. 17 is an enlarged fragmentary vertical sectional view through the discharge end of one of the tubes showing in elevation the retainer in closed position.
Figure 19:
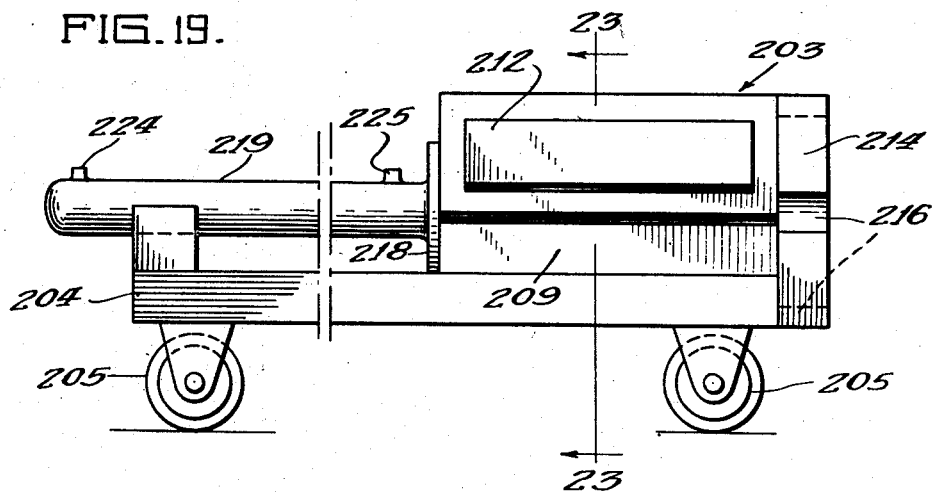
Fig. 19 is a side elevational view of a uranium rod loading car used in charging uranium rods into the reactor, a portion of the car being broken away.
Figure 20:
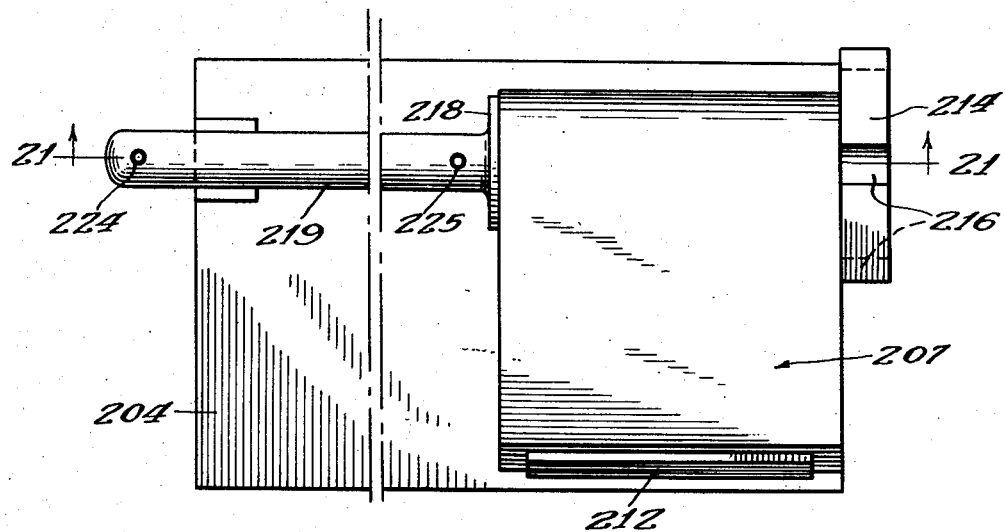
Fig. 20 is a plan view of the car shown in Fig. 19.

The cap 167 is provided with a bifurcated bracket 168 adapted to receive an arm 169 pivotally mounted at 170 on the bifurcated bracket 168. A retainer plug 171 is mounted on the free end of the arm 169 and this plug is substantially hemispherical in shape and adapted to fit into the flared end of the tube 78 as best shown in Fig. 17. The retainer plug 171 is provided with a plurality of perforations 172 to permit the passage of cooling fluid from the tube 78 through plug 171. A torsion spring 173 (see Fig. 16) normally holds retainer plug 171 in its closed position shown in Fig. 17 so that force is required to open the plug to the position shown in Fig. 18 and to retain it in this open position.

Figure 10:
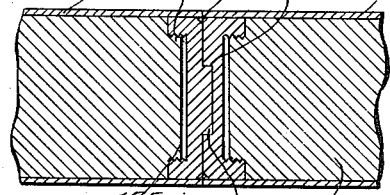
Fig. 10 is an enlarged fragmentary longitudinal sectional view taken through two segments of uranium rods showing the interlock between rod segments.

Each uranium rod 140 comprises a plurality of rod segments 140a as best shown in Figs. 10 and 18 interlocked together to form in effect the continuous rod 140.

On each end of each segment 140a is threaded as at 176 an aluminum end cap 175. An aluminum sheath 177 closely fits around the periphery of each rod segment 140a and is welded to the end cap 175 as at 178, thus completely sealing the uranium rod segment 140a within aluminum. The rod segments 140a are arranged end to end in each tube 78, and the end caps 175 of adjacent ends of adjoining rod segments 140a are provided respectively with male and female portions 175a and 175b cooperating to form an effective interfit between adjacent rod segments.

As shown in Fig. 14, the rod segments 140a when interfitted form, in effect, a continuous uranium rod extending from the valve 127 to the discharge end of the tube 78 where the rod retainer 171 is disposed.

The cooling medium, that for purposes of illustration is water, enters the tubes 78 through ring headers 143 and then passes lengthwise through the tubes in the annular space 142 between the walls of tubes 78 and the rods 140. Thus, the water passes over the surface of the aluminum sheath 177 surrounding the uranium in each tube and thereby extracts heat that is conducted to the surface of the aluminum sheath 177 from the uranium rod 140. The water thus passing through each tube 78 flows through the openings 172 in the normally closed rod retainer 171 into the water filled tank 68.

Diphenyl as coolant

In this description, reference has been made primarily to light water as the coolant for the system. As previously mentioned, diphenyl, also known as biphenyl or phenylbenzene, is also a satisfactory liquid coolant. This substance has the chemical formula $C_6H_5C_6H_5$ and is in the form of a solid at atmospheric temperature, melts at 70° C. and has a boiling point of 225° C. Thus a system employing diphenyl as the coolant must be operated at a temperature such that the coolant at all times maintains a temperature above 70° C.

Diphenyl has a lower absorbing characteristic for thermal neutrons than has water; for example, a loss of neutrons by absorption due to a diphenyl cooling layer of 4 millimeters corresponds to the loss due to a 2.2 millimeter layer of light water. Thus for the same reproduction ratio almost twice as much diphenyl as light water can be circulated through the reactor. The cooling passages for a system employing diphenyl can then be almost twice as wide as those for light water in systems having the same reproduction ratio; the pressure drops therefore will be less. About 10 percent to 15 percent more pumping power is required to circulate the diphenyl due to its greater viscosity. Since diphenyl solidifies at 70° C., special measures are taken to prevent solidification of the coolant while it is disposed in the portion of the cooling circuit outside of the reactor. This, of course, can be accomplished by merely maintaining the temperature of diphenyl at all times safely above 70° C. as by regulating the amount of heat extracted from the diphenyl.

Whichever coolant is used, it must be maintained in liquid form and not be allowed to evaporate into steam. If steam is produced in the tubes 78 of the reactor 75, the reduction in water density resulting therefrom immediately increases the value of the reproduction ratio for the reactor. This, of course, upsets the control balance and might prove dangerous as the exponential rise in neutron density might become too rapid to control. Thus it is important to guard against this condition by preventing the formation of steam in the tubes 78. Proper control of the neutron density in the reactor and the rate of water flow through the reactor will accomplish this result.

Helium system

In accordance with a further modification helium, air or similar gaseous agent may be used to cool the reactor. The use of helium as a coolant in the reactor offers many advantages. The neutron absorption of pure helium is negligible and it has the characteristic of readily conducting heat. For this reason a charge of helium in the reactor tends to promote heat exchange throughout the reactor. The use of helium has an additional advantage in that it replaces the nitrogen that normally would permeate a reactor exposed to the atmosphere. Nitrogen has a much higher neutron absorption factor and consequently any nitrogen absorption of neutrons to the detriment of the neutronic reaction is prevented when helium is used. Furthermore, the nitrogen density in the reactor exposed to the atmosphere changes with variations in atmospheric pressure and any such changes cause variations in the reproduction ratio of the reactor and therefore alters control requirements. Consequently, a sealed reactor containing helium is immune to changes in atmospheric pressure.

Another advantage in replacing the air content of a reactor with helium is based on the fact that the argon content of ambient air becomes highly radioactive when subjected to neutron bombardment. This radioactive argon diffuses out of the reactor exposed to the atmosphere and thus becomes a biological hazard. Such a condition does not occur in a helium filled reactor.

The air in the reactor can be replaced with helium in various ways, for instance by simple gravitational replacement; i.e., by introducing the helium into the enclosed reactor and allowing it to displace the heavier air which escapes through a suitable outlet. Another method would be first to evacuate the air in the reactor and then replace it with helium.

The helium may be circulated through a circuit as shown in Fig. 25. Here the gas is drawn from the top of the reactor 25 through pipe 350, is circulated through a container 351, driers 352, and is then returned to the reactor 25 by pump 353 through pipe 354. A water detector diagrammatically shown at 355 is placed in the pipe 350 to detect leakage of water which, if it gets into the helium, would likewise get into the graphite. In the event of such leakage, the faulty tube is located by suitable means not shown and if it cannot be repaired or replaced, it is closed off and plugged and thereafter not used.

The graphite moderator 77 may be built up of a plurality of blocks 77a (Fig. 30) bevelled along their edges as at 356 to form passages 357 through which helium gas may circulate. The tubes 78 pass through aligned holes 358 in the graphite blocks.

Specific dimensions and values for reactor

The size of the reactor required to produce a given amount of power depends upon such considerations as the geometry of the uranium and the graphite, the volume ratio between the uranium and the graphite, and the impurities in the reactor including impurities in the uranium and the graphite as well as other neutron absorbing materials such as the aluminum in the tubes and coatings and the water layer serving as the coolant. In other words, the size of the reactor depends upon the ratio of the fast neutrons produced in one generation by the fissions to the original number of fast neutrons in a theoretical system of infinite size where there can be no external loss of neutrons and where losses due to control rods, limiting rods and the like are disregarded. This ratio is known as the reproduction or multiplication factor and is referred to by the symbol K.

For a reactor employing uranium rods disposed in graphite in accordance with optimum geometry conditions and utilizing uranium and graphite that are free of impurities, the value of K would be about 1.074. This value is known as the base K for a uranium rod and graphite reactor. The value of K for the structure shown herein is determined as follows:

Base K for uranium rods in graphite_____ 1.074
Actual K loss due to aluminum
  sheathing and tube_____ 0.013
Actual K loss due to water_____ 0.023
Actual K loss due to heating of rods_____ 0.003

Total K loss_____ 0.041

The value of K for the structure shown_____ 1.035

These figures are based on a reactor of infinite size. As the reactor is reduced to a finite size, the loss of neutrons from the exterior of the reactor rises so that the reproduction ratio of a reactor of finite size is necessarily less than the value of K given above. As the size becomes finite, there is a size where the ratio between the fast neutrons produced by fission and the fast neutrons present to start the chain reaction becomes unity. The size corresponding to this condition is known as the critical size for the reactor, below which the chain reaction is not self-perpetuating. The finite size of the reactor then for a self-perpetuating system must be slightly over the critical size. It has been found in practice, however, that the size should be such that the reproduction ratio is not greater than about 1.01 preferably not greater than 1.005. If the reproduction ratio exceeds this value, the exponential rise in neutron density, when the control rods are removed from the reactor, may take place so rapidly that this rise is difficult to stop and may not be possible to stop until serious damage has been done.

The critical and operating sizes for a neutronic reactor radius R can be computed in accordance with the formulae previously mentioned.

The power unit disclosed herein for illustrative purposes may be rated at about 200,000 kilowatts, the heat energy that can be extracted from the reactor during normal operation. For this output, the required value for K with the reflector is 1.024 and without the reflector is 1.028 to give a reactor of practical size. Actually, the value of K in the reactor shown is 1.035. Thus, the requirements are met.

The principal dimensions of the reactor are as follows:

Axial length of the active cylinder of reactor 25=7 meters (23 ft.)
Radius of active cylinder of reactor 25=4.94 meters
Thickness of graphite reflector 77a=50 centimeters
Total weight of uranium metal in rods 140=200 metric tons
Weight of graphite 77 in reactor (exclusive of reflector)=850 metric tons
Size of each graphite block=8⅜" x 8⅜" x 50"
Weight of graphite in reflector=315 metric tons
Radius of uranium metal rods 140=1.7 centimeters
Length of each rod segment 140a=2 feet
Thickness of aluminum sheath 177=0.5 millimeter
Thickness of aluminum end cap 175=17 gauge
Thickness of aluminum tube 78=1.5 millimeters
Thickness of liquid layer 142=2.2 millimeters with water=4 millimeters with diphenyl
Number of rods 140 in reactor=1695
Weight of aluminum in reactor proper=8.7 metric tons
Rod spacing in square array=21.3 centimeters=8⅜ inches Surrounding each tube 78 is essentially a graphite shell having substantially uniform heat production due to neutron absorption in the graphite. This heat must pass through the walls of tubes 78 and be carried away in the water stream.

When the heat generated in the rods 140 has passed through the aluminum sheaths 177 on the uranium rods 140, it must be transferred to the flowing liquid coolant 142 and be carried away. A temperature drop occurs between the wall of aluminum tube 78 and the interior of the liquid stream, this drop being expended across the non-turbulent film of liquid coolant adjacent to the walls of the tube 78. There is also a rise in the temperature of the liquid coolant as the coolant flows through the reactor 25. The wall temperature of the aluminum tube 78 at any point consists of the rise in coolant temperature to that point plus the film drop at that point.

The coolant enters the reactor at considerable pressure and the pressure decreases as the coolant moves along the tube. Thus, the temperature at which the coolant will boil decreases as the liquid moves through the reactor. Local boiling in the coolant film may hamper the flow of heat into the flowing liquid, and for this reason the wall temperature everywhere is kept lower than the boiling temperature of the liquid coolant. By keeping the coolant under some excess pressure as it leaves the reactor the boiling point of the coolant throughout the length of the tube is raised and the coolant can thus be allowed to have a greater temperature rise.

Specific values for the present system are as follows:

Pressure drops along rod 140=115 lbs./in.$^2$
Total flow rate in tube 78 neglecting ribs 141=1790 cm.$^3$/sec.
Velocity of flow=7 meters/sec.=23 feet/sec.
Allowance for reduction of stream cross section by ribs 141=10 percent
Flow rate with ribs 141=1600 cm.$^3$/sec.
Output of central rod 140=56,000 cal./sec.
Average output per rod 140=118 kw.=28,200 cal./sec.
Total volume of water in reactor 25=2.75 cubic meters.
Maximum heat from rod 140 per unit length=110 cal./sec./cm.
Maximum heat into water per unit area=10 cal./sec./cm.$^2$
Film transfer coefficient=1.2 cal./sec./cm.$^2$/° C.
Input temperature of water to reactor 25=35° C.

The foregoing values refer to the water cooled system. If diphenyl is used the only construction change required in the reactor 25 is to increase the thickness of the annular cooling space 142 to 4 millimeters as previously mentioned. The temperature rise of diphenyl is about the same as in the case of water, but the drop in temperature across the non-turbulent film adjacent to the inner walls of each tube 78 is about 5 times that of water.

Again referring to a system wherein water cooling is employed it is seen that the emergent temperature of the central water stream is 123° C. for the input temperature specified, so that the emergent pressure must be at least 20 pounds per square inch to avoid boiling of the coolant water in the tubes 78.

In the arrangement disclosed herein the coolant completely separates uranium metal 140 and the graphite 77 and thus interposes a neutron scattering layer between the moderator and the uranium to slow neutrons passing from the graphite to the uranium metal. This blocking effect forces the density of the thermal neutrons in the graphite to be greater than they otherwise would be and thereby increases the graphite absorption of neutrons. The loss due to the use of a 4 millimeter cooling layer of diphenyl corresponds to that for a 2.2 millimeter layer of water so that the two arrangements disclosed herein, i.e., the one employing water as the coolant and the other diphenyl, have the same multiplication factor.

The foregoing values for the multiplication factors are based on the assumption that the air has been removed from the reactor so as to eliminate the absorption of neutrons by nitrogen. This can be done effectively by charging the reactor with helium gas having a high thermal conductivity to aid in the transfer of heat to the coolant.

Aluminum is a satisfactory material from which the tubes 78 and the sheaths 177 are made. Beryllium also may be used.

Shields

The required thickness of shield 93 depends on how close persons will stand with respect to the reactor and for how long a time they will be thus exposed. For purposes of illustration, a thickness of 12 feet has been selected as the minimum thickness for this shield. An equivalent depth of water exists over the top of the reactor 25.

The water and concrete shield 93 surrounds only three sides and the top of the reactor 25. The fourth side constitutes the inlet or loading side of the reactor where uranium rods 140 are charged into the reactor 25. The shield 76 (see Fig. 14) serves to protect operating personnel from the harmful radiations resulting from the neutronic reaction.

This shield 76 comprises an inner and an outer shield portion 76a and 76b, respectively, separated by the partition 131. This partition 131 maintains a complete separation between the shield portions 76a and 76b. Shield portion 76a is disposed adjacent to the reactor 25 and thus is subjected to neutron bombardment and thereby becomes radioactive, generating considerable heat. The water 134 in the shield portion 76a is therefore circulated out of the shield through pipe 200, is cooled, and then is returned to the shield portion 76a through return pipe 201. Thus, the temperature of shield portion 76a is controlled. The temperature of shield portion 76b may be sufficiently stable without requiring artificial cooling.

By separating the shield 76 into the two portions 76a and 76b as described, an advantage is derived other than the easy maintenance of the proper temperature. Neutrons entering the inner shield portion 76a are absorbed before they reach the outer shield portion 76b. Since there is no intermixing of the water between the two shield portions 76a and 76b, the radioactivity resulting from neutron absorption is limited to the inner shield portion 76a. Thus, the arrangement is effective in protecting operating personnel from any harmful radiations induced in the shield 76.

Referring again to Fig. 14, the shield 76 may be fabricated in the form of a plurality of tanks nesting together and held by means of complementary interlocking joints generally indicated at 202.

On the outside of shield 76 in the space between tube sheet 135 and plate 124 is disposed the lead wool or shot 136 serving as an additional absorber of gamma rays.

Control system

The device above described is ideally adapted for automatic control to maintain the neutron density inside the reactor substantially constant, and thus gives a substantially constant rate of production of element $94^{239}$. Due to the fact that large masses of materials are utilized in the reactor, there is a temperature lag therein. Consequently, it is convenient to monitor the structure by means of ionization chambers and equivalent devices responding to the neutron density at the periphery of the reactor. As the rate of neutron diffusion out of the neutronic reactor 25 is always proportional to the rate of release of neutrons within the structure, the ionization chambers can readily be placed at the periphery of the reactor and in fact are preferably so placed that they may not be subjected to the extremely high neutron density existing within the reactor.

For purposes of illustration, one control rod 179 and one emergency or safety rod 180 are shown in position for operation in the neutronic reactor Fig. 24. Obviously many more control rods and safety rods may be employed. These rods project into channels in the moderator.

The safety rods 180 are normally disposed in their extreme upper position out of the reactor and are held there during operation of the neutronic reaction. Their purpose is to stop the reaction either when it becomes too violent, or under normal conditions when the reaction is to be stopped. They function as efficient neutron absorbers, and when in their lowered position in the reactor they absorb a sufficient number of neutrons to lower the reproduction ratio of the reactor to a value well below unity.

Iron and cadmium are relatively good neutron absorbers, and therefore serve as very satisfactory materials for safety rods. The incorporation of boron in the iron increases the efficiency of the rod as a neutron absorber, and therefore is advantageous in the rod composition.

Before proceeding to a detailed description of a control circuit that may be utilized in controlling the neutronic reaction, it is desirable to point out the manner in which the control rods operate to regulate the neutron density.

In any self-sustaining chain reacting structure adapted to produce power or element $94^{239}$, the attainable neutron reproduction ratio and reproduction factor of the system must be sufficiently greater than unity to establish and maintain the desired output. For any value over unity, the chain reaction becomes self-sustaining and the neutron density, without control, would increase exponentially in point of time until the device is destroyed. For proper control, the system must be held in balance by maintaining the neutronic reaction at some point where the production of new neutrons is balanced with the neutrons initiating the chain. Under these conditions, the reaction will continue to maintain the neutron density in the reactor the same as existed when the system was balanced.

However, in order to enable the reactor to reach a desired neutron density, the system must be permitted to rise in neutron density for a period of time until the desired density is reached. It is necessary thereafter only to hold the system in balance.

Inasmuch as the reproduction ratio in any self-sustaining chain reacting system is reduced by the presence of impurities that absorb neutrons, such impurities can be introduced into the active portion of the structure in the form of a control rod of a material such as boron or cadmium capable of absorbing large amounts of neutrons. The depth the rod penetrates into the reactor will determine the amount of neutron absorption and therefore the reproduction ratio of the system. A range can be obtained between a condition providing a neutron reproduction ratio that is greater than unity and a condition at which no chain reaction can be maintained. The exponential rise in neutron density can be made relatively fast or relatively slow in accordance with whether the reproduction ratio is permitted to be much greater than unity or only slightly greater than unity.

There is a small percentage of delayed neutrons emitted in the fission process causing the neutron density in the reactor to rise in a finite time rather than instantaneously. The time required for doubling the neutron density increases as the reproduction ratio approaches unity, and any desired rate of rise in neutron density can be obtained.

As a general rule, the reproduction ratio of a neutronic system with all control rods in their withdrawn position should not be greater than about 1.005. At this value the neutron density in the system will double itself every seven or eight seconds and can therefore be easily controlled.

When initially placing a neutronic system such as that shown in Fig. 8 into operation, the safety rod 180 diagrammatically illustrated in Fig. 24 is withdrawn and then the control rod 179 is withdrawn from the reactor to a point where there is an exponential and preferably slow rise in neutron density. When a desired neutron density has been reached, the control rod 179 is then returned into the reactor to a point where the reaction is balanced. This balance is then maintained so as to keep a constant power output or production output of element 94$^{239}$ in the reactor. The maintenance of the balance point with the control rod would be relatively simple were it not for the fact that changes in temperature in the reactor result in changes in the reproduction ratio. It is desirable, therefore, that the control rod be so manipulated that a substantially constant neutron density is maintained within the system. Such a method of control may be accomplished by automatically connecting the control rod 179 through automatic adjusting means controlled by an ionization chamber or similar device responding to neutron density conditions within the reactor. Furthermore, due to the exponential rise in neutron density within the reactor when the reproduction ratio is greater than unity, all possible precautions must be taken to prevent a continued exponential rise in neutron density in the event of failure of the control rod to return to position.

While there are many means by which the control rod can be operated, it is believed sufficient to illustrate and describe one simplified control circuit to the end that fully equivalent circuits will be made apparent to those skilled in the art.

Referring to Fig. 24, there is shown diagrammatically one form of control circuit reduced to lowest terms, that might be used for regulating by means of control rods the output of the plant hereinbefore described, and attention is focused first on the control circuit shown at A. A control ionization chamber 181 is placed at the periphery of the reactor 25 and is filled with boron fluoride. A central electrode 181a is provided within the chamber 181 and connected to a wire 183 leading outside the reactor to a movable slider 184a on a resistor 184. The resistor 184 is connected across a relay coil 185; one side of this coil is connected to one side of a battery 186 and the other side of the battery 186 is connected to a shield 187 around the wire 183. The shield 187 is grounded as is the chamber 181.

Alpha ray ionization due to the neutron reaction with the boron within the chamber 181 is proportional to the neutron density in the region of the resistor 184. Thus, the current in the resistor is varied in accordance with neutron density reaching the ionization chamber 181.

The relay coil 185 operates a relay armature 188 that is spring biased by a conventional spring 189 to contact one motor contact 190 and is urged by the electromagnetic attraction in response to a sufficient current passing through the relay 185 to contact a second motor contact 191. Contacts 190 and 191 connect to the outside of a split winding or motor 192, the central terminal 182 being connected through power mains to the relay armature 188.

The motor 192 rotates a shaft 193 having on one end thereof a pulley 194 and on the other end thereof a control rod gear 195. The control rod gear 195 meshes with a rack 196 on the control rod 179.

The pulley 194 has a cable 197 wound thereon that in turn is connected to a counter weight 198 so that the weight of the control rod 179 is substantially balanced by the counter weight 198 so as to permit the motor 192 to run easily in either direction.

During normal operation of the system where the neutronic reaction is controlled only by control rods 179, the slider 184a on the resistor 184, having previously been calibrated in terms of neutron density, is moved to the density position at which the reactor is intended to operate, taking into account the difference in neutron density at the center of the active portion of the reactor and at the periphery thereof during the operation. This difference is a constant ratio at various operative densities. When the reproduction ratio in the reactor is less than unity, as is the case when the control rods 179 are disposed at a sufficient distance in the active portion of the reactor, the neutron density at the position of the ionization chamber 181 is much lower than that required to energize the relay coil 185 sufficiently to overcome the action of spring 189 so as to move the armature 188 away from motor contact 190. Thus, the motor 192 under these conditions is energized to withdraw the control rod 179 from the active portion of the reactor to a point determined by a limit stop 199 where the reproduction ratio of the reactor is just sufficiently greater than unity to permit a slow rise in neutron density in the reactor. The motor 192 will stall when the row 179 is at the stop 199, and should be of the type permitting stalling for a sufficient time to allow the next succeeding operations to be effected. The reaction at this position of the control rod becomes self-sustaining and the neutron density rises. In consequence, the ionization taking place within the ionization chamber 181 rises. As the ionization increases, the current passing through relay coil 185 also increases until a predetermined field density is reached. When the induced magnetism in the relay coil 185 has reached a predetermined strength the effect of the spring 189 is overcome and the armature 188 is attracted to the adjacent pole of the relay 185 thus connecting the armature 188 to the motor contact 191. This energizes the motor 192 so as to operate in the reverse direction to that of original operation, so as to drive control rod 179 downwardly into the active portion of the reactor thereby causing the neutron density in the reactor to rise less rapidly and eventually to decay. As soon as the neutron density decays to a predetermined lower value that is approximately at or slightly below that corresponding to the setting of the slider 184a, the control rod 179 having then adjusted the reproduction ratio to a value approximately equal to or usually slightly below unity, the magnetic strength of the relay coil 185 becomes weakened to the extent that the spring 189 again acts to move the armature 188 against the contact 190. The control rod 179 will thus hunt between a point above the balance position where the neutron density rises and a point below the balance position where the neutron density decays, thus providing an average neutron density within the reactor as determined by the setting of slider 184a on the resistor 184. Since the mass of the reactor causes temperature change to lag behind neutron density change, the temperature of the reactor is maintained substantially constant. If desired, any of the well-known anti-hunting circuits may be utilized as will be apparent to those skilled in the art.

The main purpose of the control circuit A is to regulate the control rod 179 to balance the neutron density in the active portion of the reactor so as to maintain any desired average temperature within the reactor.

*Emergency control system*

In the event of emergency, or for other reasons, it may be desirable to discontinue the neutronic reaction. This may be done by rapidly driving into the reactor a sufficient number of safety rods to reduce the reproduction ratio of the reactor below unity.

Referring to Fig. 24, one such emergency or safety rod is shown at 180. At the upper end of the rod is a piston 301 operating in a cylinder 302. At the upper end of the cylinder 302 is a passage 303 connecting the cylinder to a source of fluid pressure, not shown. At the lower end of the cylinder 302 is an exhaust port 304. The piston 301 is adapted to move up and down in the cylinder 302. A second exhaust port 305 is disposed in the passage 303. The function of the fluid pressure created in the cylinder 302 is to force the piston 301 from an upward position in the cylinder 302 to a position adjacent to the bottom of the cylinder, as a result of which movement the emergency or safety rod 180 is rapidly inserted into the reactor 25. Inasmuch as the rod 180 is heavy some means is provided to cushion the rod when it reaches its lower position. This cushioning means is illustrated in the form of a dash pot 306 provided with a small exhaust opening 307 and adapted to receive the plunger 308.

During normal operation of the reactor 25 the safety rod 180 is in its upper position as illustrated in the drawings. An inlet valve 310 in the pressure line 303 is normally closed and an exhaust valve 311 in the exhaust passage 305 is normally open.

For purposes of illustration a simple control circuit for operating the safety rod 180 is generally indicated at B. This control circuit includes an electromagnetic solenoid 315 that is normally energized from the power mains to hold a movable armature 316 iside the solenoid. This armature 316 is attached to the valve operating arm 317 connected at its opposite end to the inlet valve 310. The exhaust valve 311 likewise is fastened to the operating arm 317 by means of member 318. A tension spring 319 normally urges the valves 310 toward its open position and at the same time urges valve 311 toward its closed position. As long as solenoid 315 is energized, however, from the power mains, the force of spring 319 is overcome and the armature 316 is held inside the solenoid 315 so that valve 310 is normally closed, whereas valve 311 is normally open.

Solenoid 316 is one element in a holding circuit that also includes a magnetic clutch 320, a circuit breaker 321, a flow switch 322 and a manually operated circuit breaker 323, all connected in series by wiring 324. The circuit breaker 321 normally makes contact with contact 321a, whereas circuit breaker 323 normally makes contact with contact 323a. A spring 325 normally urges the circuit breaker 321 against contact 321a and a spring 326 normally urges a manual circuit breaker 323 against contact 323a. The flow switch 322 is disposed in the cooling water header 47 and is normally maintained in closed circuit position by the normal pressure of the cooling fluid passing through the header 47. If for any reason water ceases to flow through header 47 or the flow drops below a predetermined rate, the flow switch 322 automatically opens thereby breaking the circuit through the solenoid 315.

The circuit breaker 321 serves as an armature in a magnetic relay. The magnetically operated relay coil 330 is disposed in an operating circuit that includes an ionization chamber 331 situated at the periphery of the neutronic reactor 25, a central electrode 332, a conductor 333 connecting the central electrode 332 to a movable contact slider 334 operating along a resistor 335. The relay coil 330 is disposed in the circuit with the resistor 335, the circuit being completed through conductor 336. A battery 337 is in the circuit with the relay coil 330 and is connected to a shield 338 surrounding the conductor 333. The battery 337 is grounded at 339.

After the safety rod 180 has been forced into the reactor it must be raised by some power means to return it to its normal withdrawn position. For this purpose a motor 340 mounted on a shaft 341 is connected to a pinion wheel 342 that in turn engages a rack 343 mounted on the safety rod 180. The weight of the safety rod 180 is counterbalanced by a weight 344 operating over a pulley 345 mounted on the shaft 341. The magnetic clutch 320 is mounted on the shaft 341 between the motor 340 and the pinion 342. Power for the motor 340 is provided from the power mains through conductors 346 and a manually operated circuit breaker 347 opens and closes the circuit depending upon the requirements for the motor 340. A tension spring 348 normally holds the circuit breaker 347 open.

The operation of circuit B in controlling the position of the safety rod 180 will now be explained. When the neutronic reactor 25 is normally operating, the safety rod 180 is in its raised position outside the reactor as shown in Fig. 24. Under this condition the circuit breakers 321 and 323 as well as the flow switch 322 are closed so that the solenoid 315 is energized from the power mains. The magnetic clutch 320 also is energized through the same circuit so that the safety rod 180 is held in its raised position by the counterweight 344. As shown, the solenoid 315 will be de-energized in the event of four different conditions or any combinations thereof as follows: (1) power from the mains fails; (2) the neutron density in the reactor 25 exceeds a predetermined value so as to cause ionization in the chamber 331 to the extent that the magnetic relay 330 becomes energized sufficiently to break the circuit through the circuit breaker 321; (3) the flow switch 322 opens the circuit due to complete or partial failure of the cooling medium to flow through the header 47; and (4) the circuit breaker 323 is opened manually.

As soon as the solenoid 315 becomes de-energized by any one or combination of the foregoing events the armature 315 moves in response to the action of spring 319 to open the valve 310 and simultaneously close valve 311, thus introducing into cylinder 302 fluid through the fluid pressure line 303. Simultaneously with the de-energization of the cylinder 315, the magnetic clutch 320 also becomes de-energized. Thus, the safety rod 180 is free to drop by gravity into reactor 25, but in addition to the force of gravity the fluid pressure against the piston 301 rapidly forces the rod into the reactor 25. When the rod approaches its lower position in the reactor 25, the plunger 308 enters the dash pot 306 compressing the air therein to cushion the final stages of the fall. In this manner the neutronic reaction in the reactor 25 is stopped.

When it is again desired to place the neutronic reactor in operation and the various circuit breakers and the flow switch 322 are in position so that this can be done the circuit can be closed to return armature 316 to its position inside the solenoid 315, thus closing the fluid pressure line and opening the discharge port 305 on the fluid inlet side of the piston 301. At the same time, the magnetic clutch 320 becomes energized so that on closing the manually operated circuit breaker 347, the motor 340 becomes energized and operates to raise the safety rod 180 to its withdrawn position illustrated in the drawings.

The system described has been reduced to lowest terms for illustrative purposes and is not deemed to be limiting, as equivalents will readily be suggested to those skilled in the art.

Other embodiments

Referring to Figs. 26 to 29 inclusive various different arrangements are shown for cooling the uranium in the reactor. In Fig. 26, the uranium is in the form of a hollow tube 359 surrounded by an aluminum shealth 360 and lined with an aluminum liner 361. In the arrangement shown in Fig. 26, a thin coating of non-fissionable material may be used instead of the sheath 360, since as shown, its purpose is to prevent the escape of fission fragments. The water passes through the uranium tube 359 as shown at 362, the liner 361 serving as a protective coating to prevent corrosion of the uranium tube 359 by the water 362. A gap 363 is provided between the uranium tube 359 and the surrounding graphite moderator 77. This gap is needed to a greater extent in this arrangement than in the case where the water film is disposed between the uranium rod and the graphite due to the greater differential in heat between the uranium and the graphite. A gas, such as helium, may be passed through this gap 363.

Referring to Fig. 27, another arrangement is shown wherein a uranium tube 364 is covered by an aluminum sheath 365 and lined with an aluminum liner 366; and a uranium rod 367 is disposed in the hollow portion of the uranium tube 364 but is of less diameter than the inside diameter of the uranium tube 364 so as to provide a space between the uranium rod 367 and the inner face of the liner 366 through which space water 368 circulates. This uranium rod 367 is covered by an aluminum sheath 369 that is provided with longitudinal ribs 370 serving as spacers to properly center the uranium rod 367 inside the uranium tube 364. Again a gap 371 is provided between the uranium tube 364 and the graphite moderator 77.

Still another modification is shown in Fig. 28. Here an aluminum tube 372 is disposed in the graphite 77 and inside this tube is a uranium tube 373 of lesser diameter than the inside diameter of the aluminum tube 372, and longitudinal ribs 374 are provided along the inner face of the aluminum tube 372 cooperating to properly center the uranium tube 373 in the aluminum tube 372. The uranium tube 373 is covered on its outer surface with an aluminum sheath 375. Water is circulated at 376 in the annular passages between the aluminum sheath 375 and the aluminum tube 372. The center portion 377 of the uranium tube 373 may be hollow and left empty or as shown in Fig. 29 may serve as a second passage through which water or gas 378 circulates. Thus, in the last embodiment shown in Fig. 29, the uranium tube 373 is externally cooled by water stream 376 and is internally cooled by water or gas stream 378 or by a different fluid such as diphenyl, air, etc.

Auxiliaries

*Flash tank.*—The flash tank 42 shown in Fig. 4 comprises a steel cylindrical tank approximately 22 feet in diameter and 40 feet high with conical top and bottom 42a and 42b, respectively, and contains about 13,300 cubic feet of water. The water leaving the reactor 25 has a temperature of about 2° F. above the boiling point at the existing atmospheric pressure and is at a pressure of about 20 pounds per square inch gauge. This water before entering the flash tank 42 first passes through the throttling valve 41a, where the pressure is reduced to about atmospheric pressure. As the result of this reduction in pressure, some of the water vaporizes and most of the free oxygen and hydrogen in the water is carried into this water vapor. The water at this reduced pressure enters the tank through the spray head 48 and additional steam is formed inside the flash tank 42. The liquid water leaving the spray head 48 has a temperature approximately corresponding to the boiling point at the existing pressure and passes through approximately a 5 foot spray space striking the top surface, indicated at 49 of the water contained in the flash tank 42. The hot water in the tank passes downwardly through a gravel filter 50, of about 2 feet in depth, where suspended solids such as iron rust and aluminum hydroxide are removed from the circulating system. The water passes through the filter 50 at the rate of about 0.17 feet per second. The pressure drop through the gravel is about 1.4 pounds per square inch. The water leaves the tank through the pipe 43. A discharge pipe 39 provides a passage through which the flash tank 42 can be drained.

*Flash tank condenser 52.*—The mixture of steam, hydrogen and oxygen in the flash tank 42 passes off through an opening 51 in the top of the flash tank, over flash chamber condenser coils 52 where some of the steam condenses and drops back into the flash tank 42. The remaining gases, hydrogen, oxygen and some water vapor pass out through stack 53 and are diluted with air to reduce them below an explosive mixture and are then exhausted into the air. Because of the high oxygen content of the atmosphere around the condenser coils 52 and the severe corrosive action caused thereby, the coils 52 are preferably made of brass while the tube sheets are made of steel.

Specific data for a satisfactory condenser is as follows:

FLASH CHAMBER CONDENSER

| | |
|---|---|
| Water vapor condensed | 29,500 lb./hr. |
| Heat transferred | 28,600,000 B.t.u/hr. |
| Temp. condensate | 212° F. |
| Temp. cooling water in | 85° F. |
| Temp. cooling water out | 130° F. |
| Heat transfer coefficient | 150 B.tu./hr. ft.$^2$ ° F. |
| Heat transfer area | 1900 ft.$^2$. |
| Tube diameter | ¾ in. |
| Wall thickness tubes | 14 BWG. |
| Tube length | 4 ft. |
| No. tubes | 2520. |
| Shell diameter | 60 ins. |
| Tube material | Brass. |
| Tube sheet material | Brass. |
| Shell and heads | Iron. |

*Heat exchangers 44.*—Though only one heat exchanger 44 is shown, more than one may be used. The heat exchangers 44 per se form no part of the present invention. As an example of a specific type, however, that is satisfactory for the system disclosed, heat exchangers of the shell and tube type are suggested with the water from the reactor 25 disposed inside the tube and the cooling water from the cooling tower 54 being on the outside of the tubes. If steel tubes are used in the heat exchangers corrosion inhibitors in both water streams would be used.

As a specific example, for a heat exchanger, the following data are given:

| | |
|---|---|
| Heat transfer rate | 1.679×10$^6$ B.t.u./hr. |
| Temperature dist. water in | 212° F. |
| Temp. dist. water out | 95° F. |
| Temp. cooling water in | 85° F. |
| Temp. cooling water out | 130° F. |
| Distilled water flow rate | 28,700 g.p.m. |
| Cooling water flow rate | 74,600 g.p.m. |
| Log mean temperature difference | 34.2° F. |
| Heat transfer area, outside of tubes including spares | 329,000 ft.$^2$. |
| Overall heat transfer coefficient | 186 B.t.u./hr. ft.$^2$ deg. ° F. |
| Tube fluid | Distilled water. |
| Shell fluid | Cooling tower water. |
| Tube length | 20 ft. |
| Tube O.D. | 0.75″. |
| Tube I.D. | 0.584″. |
| No. shell passes per exchanger | 2. |
| No. tube passes per exchanger | 2. |
| Shell I. D. | 6 ft. |
| No. tubes per exchanger | 3500. |
| No. exchangers, total | 24. |
| No. exchanger banks, in parallel including 1 spare bank | 6. |
| No. exchangers per bank in series | 4. |
| No. banks in normal operation | 5. |
| No. stand-by banks | 1. |
| Pressure drop on shell side, total for battery | 30 p.s.i. |
| Pressure drop on tube, side total for battery | 13 p.s.i. |
| Material | Steel and iron. |

*Pumps 46.*—Although only one pump 46 is shown in Fig. 4, of the drawings, more than one actually would be provided to assure circulation of water through the reactor 25 in the event of failure of one of the pumps. The combined normal capacity of the pumps handling the flow of the cooling water through the reactor 25 must be about 28,700 gallons per minute. It is suggested that eight pumps be provided, any six of which can carry the normal load. With this arrangement, two pumps are available for standby service in the event of failure of one or two of the six normally carrying the load. Again for the purpose of illustration, specific data for the water pumps 46 are as follows:

| | |
|---|---|
| Pumping rate | 28,700 g.p.m. |
| Minimum No. units desired | 6. |
| No. spare units desired | 2. |
| Discharge pressure | 150 p.s.i. gage. |
| Suction pressure | 0 p.s.i. gage. |
| Suction temperature | 95° F. |
| Power required | 3300 kw. |
| Power material | Stainless steel. |

*Cooling tower 54.*—The cooling towers 54 can be of conventional design. Though in Fig. 4 the one illustrated is disposed relatively close to the remaining portions of the system, it is possible to locate the cooling towers at some distances.

As a specific example of a satisfactory cooling tower and cooling water for the system, specifically disclosed herein the following data are given:

| | |
|---|---|
| Temperature water in | 130° F. |
| Temperature water out | 85° F. |
| Loading density | 2 g.p.m./ft.$^2$. |
| Hot water rate | 75,800 g.p.m. |
| Tower area required | 37,900 ft.$^2$. |
| Water evaporation rate | 3,300 g.p.m. |
| Maximum probable water draw-off rate | 165 g.p.m. |
| Windage water loss rate | 760 g.p.m. |
| Treated water make-up rate | 4,225 g.p.m. |
| Power required for cooling tower fans | 1,000 kw. |
| Tower material | Wood. |

*Secondary cooling water pump 55.*—Although only one pump 55 is shown in Fig. 4, more than one can be used. The design of the pump disclosed is conventional and again for purposes of illustration, the following specific data for a satisfactory pump are given:

| | |
|---|---|
| Pumping rate | 75,800 g.p.m. |
| Minimum No. units desired | 7. |
| No. spare units recommended | 1. |
| Discharge pressure | 50 p.s.i. gage. |
| Suction pressure | 0 p.s.i. gage. |
| Suction temperature | 85° F. |
| Power required | 3,000 kw. |
| Pump material | Iron or steel. |

Additional accessories

It may be necessary to discard the water after it is passed through the reactor 25 because of contamination with certain impurities, some of which may be radioactive. It may be desirable further to employ inhibitors, in which case, the inhibitor concentration may gradually increase and for this reason the water in the primary cooling circuit passing through the reactor 25 may have to be discarded. The disposal of this discarded water must be done with considerable care because of the likelihood of radioactive materials being present in the water. It may be desirable to provide an evaporator or still, not shown, to which the water from the reactor 25 can be directed. The purpose of this evaporator would be to concentrate the waste material in the water to a relatively small volume to permit discarding it into deep wells.

Construction

When building the plant herein described, the necessary excavations are made, all the concrete is poured including the concrete walls forming the shields surrounding the reactor, the metal work is installed, the graphite and aluminum tubes included in the reactor are installed and the entire plant is assembled including all of the external equipment except that the uranium is not inserted in the aluminum tubes. Thus, before the uranium is charged into the reactor, the entire plant is assembled and all the shields are fitted into place and filled with water, or water and shot, as the case may be and all control rods are installed. The electrical control circuit is installed and placed into operating condition.

After the entire plant has thus been assembled and it is in readiness for operation with the exception it lacks the uranium, the time is then proper for charging the uranium into the reactor. Before this is done, however, all of the control rods and safety rods are inserted their full distance into the reactor. The loading operation is then started.

Loading and unloading reactor

The present invention relates specifically to the loading of the uranium rods into the reactor and the discharging of same after they have been subjected to neutron bombardment in the reactor.

Referring to Fig. 14, the uranium rods are loaded or charged into the reactor at the inlet side of the reactor shown at the extreme left-hand side of the figure and are discharged at the outlet side of the reactor shown at the right-hand side.

Figure 21:
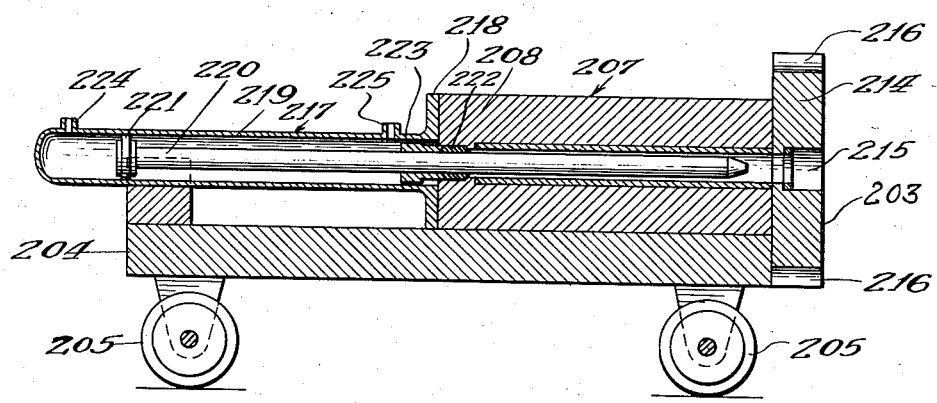
Fig. 21 is a longitudinal sectional view taken on the line 21—21 of Fig. 20, the plunger being shown in elevation.
Figure 22:
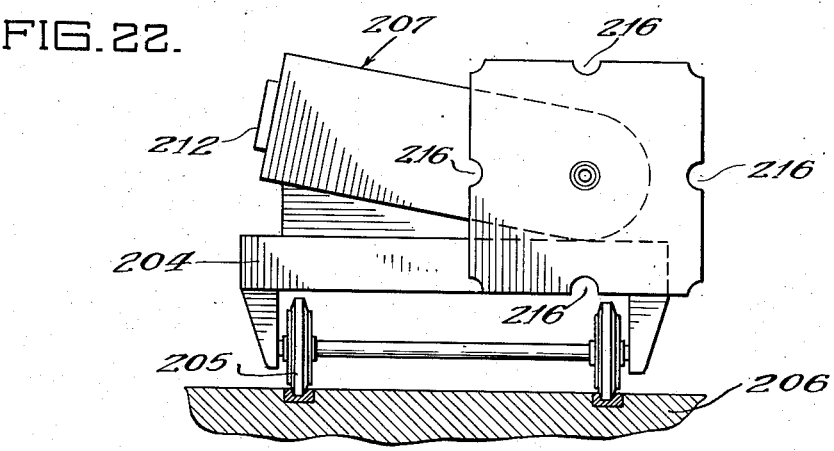
Fig. 22 is a front elevational view of the car shown in Fig. 19.

Referring to Figs. 19 to 23, inclusive, a loading car generally indicated at 203 is illustrated and comprises a flat car 204 mounted on wheeled axles generally indicated at 205 operating on tracks 206, the flat car 204 carrying a loading device generally indicated at 207 in Fig. 21.

Figure 23:
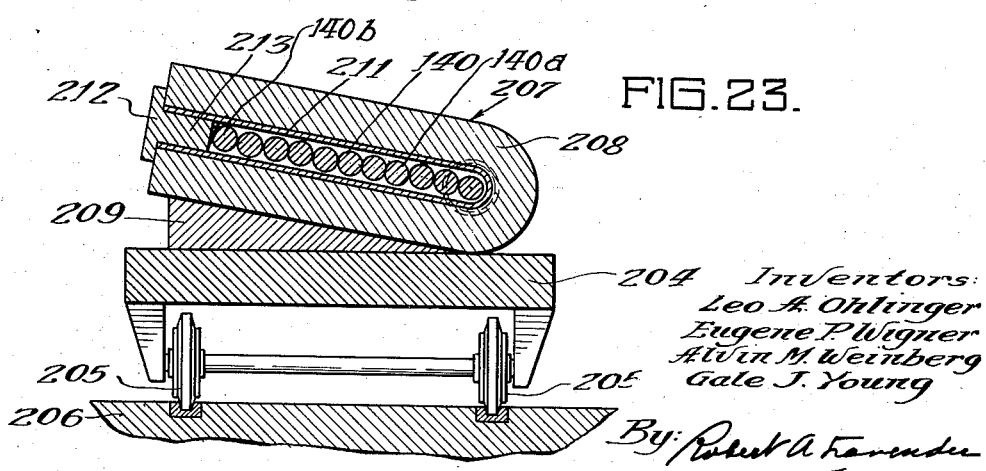
Fig. 23 is a vertical sectional view taken on the line 23—23 of Fig. 19.

The loading device 207 comprises a magazine 208 mounted on a wedge shaped support 209 (see Fig. 23). The magazine 208 is generally U shape in cross section and is adapted to receive a plurality of uranium rods 140. Thick walls of lead are provided on the magazine 208 and they are lined at 211 with a steel plate. A cover 212 closes the open side of the U shaped magazine 208 and this cover is in the form of a plug having a shank portion 213 fitting into the open portion of the magazine.

The front of the car 203 is provided with a lead plate shield 214 having a central opening 215 and cut-out semi-circular portions 216 at each edge. The central opening 214 is alined with the bottom of the open portion of the U shaped magazine 208.

Behind the magazine portion 208 is a plunger assembly 217 secured to the magazine portion 208 by flanges 218 and comprising a cylinder 219 having mounted therein a plunger 220 carrying a piston 221. The plunger 220 projects into the magazine 208 in alinement with the opening 215 in the end shield 214 and a conventional packing gland 222 held in place by a bushing 223 seals the opening between the cylinder 219 and the magazine 208. The plunger 220 may be operated hydraulically, in which case inlet and outlet ports 224 and 225 respectively are disposed in the cylinder 219 on opposite sides of the piston 221.

Referring to Figs. 5 and 6, an elevator structure 226 mounted on upper and lower trackways 227 and 228, respectively is disposed at the loading side of the reactor 25 and is adapted to move transversely across the loading end of the tube 78. An elevator platform 229 (see Fig. 6) is mounted on the elevator structure 226 and is adapted to move vertically with respect to the tubes 78.

A loading car 203 is carried on the elevator platform 229. Thus it is possible to select any tube 78 and place the car 203 with the opening 215 in its front face directly alined with the selected tube. The cap 151 (Fig. 12) on the end of the selected tube is removed and the car 207 is moved so that the free end of the selected tube 78 enters the opening 215 in the front face of the car and the tube is then sealed against a gasket 230 (Figs. 10 and 12). The wheels of the car 207 may then be blocked as at 231 to lock the car in place. The car is now in position to commence loading uranium rods into the reactor.

The magazine 208 may contain just the required number of rods 104a and dummy rods 140b to fill one tube 78. The strength of coil spring 173 on the rod retainer 171 holds the rods in place in the reactor.

In the instance where the rods 140 only fill those portions of the tubes disposed in the reactor 25, it is necessary that the plunger 220 (Figs. 11 and 21) be of sufficient length to force the uranium rod sections 140a into their proper positions in the reactor 25.

After a tube 78 has been loaded with uranium rods in the manner described, the plunger 220 is withdrawn from the tube into the car 207 a sufficient distance to clear the end of the tube 78. The valve 127 is then closed and the car 207 is backed away from the ends of the tubes. The cap 151 (Fig. 12) is replaced on the end of the newly loaded tube 78 and a freshly loaded car 207 is alined with the next selected tube 78 by moving the elevator 229. The loading process is then repeated until all of the desired tubes are filled with uranium rods. The steps for replenishing the tubes with fresh rods include essentially the procedure of the initial charging. During this period of loading and unloading or at least during a major portion of such period, circulation of water or other coolant through the system frequently is continued at a rate sufficient to prevent overheating of the fissionable material (uranium) and to remove heat efficiently.

During all of the preparations for replenishing, the valve 127 on the selected tube 78 has been closed and the cooling water has been circulated through the reactor. At the actual time unloading is to be begun uranium rods are disposed throughout the entire length of the reactor in the selected tube 78 but the neutronic reaction should have been shut down for a sufficient length of time to permit the delayed neutron emission to cease to such an extent as to be no longer dangerous. Approximately a period of one-half hour following the insertion of the control rods is required for this fission process to drop below the danger level.

Following this thirty minute period, there is no further need to circulate the water through the reactor at the same rapid rate of flow as was required while the neutronic reaction was in effect. The heat generation taking place following the termination of the fission process is due to radioactive decay of the fission products in the uranium. This heating is commonly referred to as "self-heating" and diminishes rapidly following shut-down of a neutronic reaction. It is thus possible after this 30 minute period to diminish the rate of flow of water through the reactor although it is not possible to stop the flow of water since a substantial quantity of heat continues to be evolved. Thus the water flow through the selected tube 78 is reduced to some lower rate required to extract the heat generated by self-heating in the uranium rods.

A valve 127 is now opened by means of closing the circuit to the motor 161 thus placing the selected tube 78 in communication with the interior of the loading magazine 208 on the loading car 207. The plunger 220 is now withdrawn by admitting hydraulic fluid through port 225 into the cylinder 219 until a uranium rod section 140a drops by gravity into the lowest position in the loading magazine 208 opposite the opening 215 in the front wall 214 of the loading car 207. The plunger 220 is then forced against the uranium rod section 140a thus moved into position by admitting hydraulic fluid through the port 224 into the cylinder 219. The rod section 140a is thus forced through the open tube 78. Since the tube 78, as previously mentioned, is already completely full of uranium rod sections 140a, the charging of the new rod sections into the tube 78 causes the old rods to be forced toward the discharge side of the reactor, forcing the last rod section 140a against the rod retainer 171, thereby opening the retainer and the last rod is thus ejected from the tube 78 into the water filled tank 68. The rod thus discharged immediately drops to the bottom of tank 65 through the water and into the chute 97, past open valve 98 and comes to rest against the closed valve 99. The plunger 220 forces the first fresh rod unit clear of the loading magazine 208 and then the plunger 220 is again withdrawn to allow the second rod 140 to drop to the lowest position in the magazine 208. The operation of charging this second rod section 140a into the reactor is the same as that described with respect to the first rod section and once again an old rod section is ejected at the discharge end of the tube 78 and comes to rest directly above the valve 99 in the discharge tube 97. This operation is repeated until the selected tube 78 is completely filled with fresh rods, or at least is filled with fresh rod sections 140a throughout the part of the tube 78 that traverses the length of the reactor 25. The remainder of the tube 78, that is that portion projecting through the shield 76 may be filled with dummy plugs, 140b, for example of aluminum, but the charging operation even in this event is the same as though the entire tube 78 were filled with uranium rods. The top two or three rod sections 140a in a magazine 208 are the aluminum dummy plugs 140b (Fig. 23) and as the rods are ejected, the aluminum dummy plugs are forced out along with the uranium.

Referring to Figs. 6 and 7, after all of the rods in one tube 78 have been ejected in the manner just described and are disposed in the discharge chute 97 directly above the closed valve 99, valve 98 is closed to form water lock 97a. Valve 99 is then opened allowing the rods together with the charge of water in lock 97a to drop into the container 30 disposed directly below the chute and mounted on the car 31, as hereinbefore described. The valve 99 is then again closed and the car 31 moved to a position shown in Fig. 7, where a cover 117 can be taken from the shelf 118 by the hoist generally indicated at 119 and placed on the container 30 to close the opening in the container.

As shown in Fig. 7, the car 31 is provided with three containers 30, and 3 tubes 78 can be emptied before the car 31 is fully loaded. The car 31 when fully loaded is moved through the tunnel 106 by the cable 116 or 115 to a soaking pit where the uranium rods are allowed to remain for a period of time to allow the radioactivity to decay to safe limits to permit handling of the rods. Following this, the uranium rods are processed for the purpose of extracting fission products and element $94^{239}$. These later steps form no part of the present invention and are therefore not detailed here. Frequently a substantial amount of heat is developed in the uranium or similar material during this soaking period. If desired the rods may be immersed in a body of water and steam generated directly or indirectly by the heat transferred to the water. For example the receptacle containing the water and the fissionable material may be used as a boiler to generate high or low pressure steam.

SUMMARY

It can thus be seen that the uranium rods 140 can be loaded into the reactor 25 at one side and discharged from the other. The length of time the rods are left in the reactor, of course, will depend upon the conditions of operation and the ultimate objective sought. When it is desired to remove the rods from the reactor the neutronic reaction is first discontinued. The rods then can be left in the reactor for a period of from thirty to fifty days under continuous cooling, during which period the fission products in the rods are allowed to decay to the point where the rods may be removed without further cooling. Under these conditions, the flow of cooling water through the tube from which a rod is to be removed can be completely shut off before the valve 127 is opened. The problem of removing the rod under these conditions is very simple.

It may be desirable to allow the rods to remain in the reactor following cessation of the neutronic reaction for the period of time only sufficient to permit the most violent radioactivity in the fission products to subside. Under these conditions the flow of cooling water through the tube from which a rod is to be removed can be stopped long enough to allow the rod to be discharged from the tube 78, with cooling of the rod thus discharged then being continued outside the reactor for example by discharging the rods into a body of water as previously described.

Under either of the foregoing conditions the water level in the tank 68 at the discharge end of the tubes 78 should be below the tubes from which rods are ejected during the unloading operation for otherwise the water in this tank 68 will back up through the open ends of tubes 78.

The primary advantage of the present invention, however, is the fact that rods may be removed from the reactor promptly following the cessation of the neutron reaction. Only sufficient time need be allowed to permit all delayed neutrons to disappear. Provisions are made for continuous and adequate cooling of the rods throughout the entire removal operation, thus making the subject matter of the invention particularly well suited for the continuous production of element $94^{239}$.

While the invention has been described with reference to the use of water as the cooling media it is to be understood that this is merely illustrative since other liquid coolants such as diphenyl, deuterium oxide, or other liquid which does not absorb neutrons as to an excessive degree may be used. Moreover the invention herein contemplated may be used in connection with other moderators such as beryllium or liquid moderators such as deuterium oxide. Where liquid moderators are used the channels for the uranium should possess sufficient rigidity to be self-sustaining.

While the invention has been described with reference to uranium it should be noted that numerous compositions capable of fission to yield neutrons in greater amount than are consumed in the fission may be used. Natural uranium is an effective composition of this type since it contains $U^{238}$ and $U^{235}$ in the proportion of 139 to 1. Enriched compositions containing higher concentrations of $U^{235}$ also may be used. Generally speaking a neutronic chain reaction may be conducted with various materials which yield a surplus of neutrons upon fission by neutrons such as $U^{233}$, $U^{235}$, $94^{239}$ or other fissionable isotopes. These fissionable materials may be mixed or otherwise combined with materials which absorb neutrons to yield a fissionable isotope or which yields an isotope decaying to a fissionable isotope such as $Th^{232}$ or $U^{238}$.

During the operation of the neutronic reactor particularly at high neutron densities radioactive elements of exceedingly high capture cross section may be formed in the uranium as an intermediate element in the decay chains of fission fragments and this formation will lower the value of the reproduction factor for the system. Radioactive Xenon 135 is an example of such an intermediate element, this product having a half life of about 9 hours and being formed mostly from radioactive iodine which has a half life of about 6.6 hours and decays to barium. There should be sufficient excess in the reproduction ratio of the reactor so that in the event the reproduction factor is reduced as a result of the formation of an intermediate decay element having a high capture cross section for neutrons the control rods may be withdrawn sufficiently to maintain the reproduction ratio at a value of unity while maintaining the power output at the desired level. It might be desirable to initially construct the reactor sufficiently over-sized to supply this excess reproduction ratio when needed and in this event removable impurities for example in the form of additional shim or control rods may be initially placed in the reactor and kept there at all times until the reproduction ratio commences to fall as the result of the formation of these intermediate decay elements.

Reference is made to U.S. Patent No. 2,774,730 of Gale J. Young, one of the applicants herein.

While the theory of the nuclear chain fission mechanism in uranium set forth herein is based on the best presently known experimental evidence, we do not wish to be bound thereby, as additional experimental data later discovered may modify the theory disclosed. Any such modification of theory, however, will in no way affect the results to be obtained in the practice of the invention herein described and claimed.

Obviously, many modifications may be made in the specific embodiments disclosed without departing from the intended scope of the invention.

What is claimed is:

1. A neutronic reactor comprising a moderator having a plurality of passages extending therethrough, each having a charging and a discharging end, a plurality of bodies containing thermal neutron fissionable material arranged in the passages, a downwardly directed chute disposed adjacent to the side of the reactor at the discharge ends of the passages, a liquid in the chute, and means charging the bodies into the reactor through the charging ends of the passages and discharging the bodies from the reactor through the discharge ends of the passages into the chute.

2. A neutronic reactor comprising a moderator, a plurality of parallel, horizontal, tubes arranged in the reactor and surrounded by the moderator, the tubes projecting through the reactor and opening into a discharge chute, a liquid coolant in the chute, bodies containing thermal neutron fissionable material in the tubes, and means discharging the bodies through the open ends of the tubes into the discharge chute.

3. A neutronic system comprising the combination of a reactor including a moderator capable of slowing fast neutrons to thermal energy, a plurality of horizontal passages through the moderator, a plurality of bodies comprising a thermal neutron fissionable material in each passage arranged end to end and being of a diameter less than that of the passage, each passage having a charging end and a discharging end, and a body of liquid adjacent to the discharge end for receiving the bodies discharged and breaking their fall.

4. In a neutronic system employing bodies containing thermal neutron fissionable material arranged in a neutron moderator, the method of discharging the bodies from the moderator after they have been subjected to neutron bombardment comprising first allowing the bodies to remain in the moderator for at least thirty minutes following the termination of the neutronic reaction while extracting heat from the bodies, and then while continuing to extract heat from the bodies dislodging them from their normal positions in the moderator and allowing them to pass into a reservoir containing a coolant.

5. In a neutronic system employing a neutronic reactor, the combination of the reactor including a plurality of bodies containing a thermal neutron fissionable material disposed horizontally in passage in a neutron moderator, means at one side of the reactor for loading bodies into the passages to displace bodies in the passages, a tank on the opposite side of the reactor communicating with the passages and adapted to receive the bodies thus discharged, water in the tank, a discharge passage in the bottom of the tank, and normally closed, spaced valves in the discharge passage.

6. In a neutronic system employing a neutronic reactor, the combination of the reactor including a plurality of bodies containing a thermal neutron fissionable material disposed horizontally in passages in a neutron moderator, means at one side of the passages for loading bodies into the reactor to displace bodies in the passages, a tank on the opposite side of the reactor communicating with the passages and adapted to receive the bodies thus discharged, water in the tank, the tank having a discharge passage for accommodating the bodies, and a container below the discharge passage for receiving the bodies.

7. In a neutronic system employing a neutronic reactor, the combination of the reactor including a plurality of bodies containing a thermal neutron fissionable material disposed in passages in a neutron moderator, a tank adjacent to the reactor communicating with the passages and adapted to receive bodies discharged from the reactor, a liquid coolant in the tank, the tank having a discharge passage for accommodating the bodies, and means receiving the bodies from the discharge passage.

8. A neutronic reactor comprising a moderator, a plurality of passages through the moderator, bodies of thermal neutron fissionable material in the passages, and a body of liquid adjacent to one end of the passages and communicating therewith adapted to receive bodies discharged from the passages at said ends of the passages.

9. A neutronic reactor comprising a moderator, a plurality of parallel horizontal passages extending throughout the extent of the moderator, bodies of thermal neutron fissionable material in the passages, and a body of liquid adjacent to one end of the passages and communicating therewith adapted to receive bodies discharged from the passages through said end of the passages.

10. A neutronic reactor comprising a moderator and a plurality of horizontally disposed spaced passages extending through the moderator, thermal neutron fissionable bodies in said channels, means at one end of the passages for charging said bodies into the passages, a receptacle at the other end for receiving bodies discharged from said passages, and a ray shielding means in spaced relationship with respect to the last mentioned end of the moderator, the spacing between the moderator and the shielding means being at least as great as the length of the longest of said bodies whereby bodies pushed out of said passage may fall between the moderator and the shielding means.

11. A neutronic reactor comprising the combination of a neutronic moderator capable of slowing fast neutrons to thermal energy, a plurality of passages through the moderator, a plurality of bodies comprising a thermal neutron fissionable material and disposed in the passages, each passage having a discharging end through which the bodies may be ejected from the passage, and means normally holding the bodies in each passage and releasable by force exerted on the bodies to release the bodies for discharge from the passages.

12. A neutronic reactor comprising a neutron moderator capable of slowing fast neutrons to thermal energy, a plurality of horizontal passages through the moderator, a plurality of bodies containing thermal neutron fissionable material in each passage, said passages having discharge ends through which the bodies may pass, and spring-backed members normally holding the bodies in the passages but yielding to force to allow discharging of the bodies.

13. A neutronic reactor comprising a neutron moderator capable of slowing fast neutrons to thermal energy, a plurality of passages through the moderator, bodies comprising a thermal neutron fissionable material in each passage, each passage having a discharge end through which the bodies may pass, a retaining member at the discharge end of each passage, the bodies in each passage being normally held in place by said retaining member, the retaining member being moved away from the discharge end of the corresponding passage by force applied against the bodies.

14. A neutronic reactor comprising a moderator capable of slowing neutrons to thermal energy, a plurality of horizontal passages disposed in the moderator, bodies comprising thermal neutron fissionable material in each passage, each passage having a discharge opening through which the bodies may pass, a body of water at the discharge ends of the passages, and a removable retaining member at the discharge end of each passage normally closing the discharge end but being movable by pressure to open the discharge end and allow the bodies to be ejected into the body of water.

15. In a neutronic reactor, a plurality of parallel tubes disposed horizontally in a neutron moderator, bodies of a thermal neutron fissionable material in the tubes, the tubes being open at one end, a receptacle at the discharge ends of the tubes, a quantity of water in said receptacle, an outlet pipe near the bottom of the receptacle adapted to convey water away from the receptacle, means for supplying water to the tubes at the ends opposite the open ends of the tubes, means passing water through said supply means, through the tubes, and out the open tube ends into the receptacle, a second opening at the bottom of the receptacle, means discharging fissionable bodies from the tubes through the open tube ends into the receptacle, and separate means discharging the fissionable bodies through the last mentioned opening in the bottom of the receptacle.

References Cited in the file of this patent

UNITED STATES PATENTS

| | | |
|---|---|---|
| 596,490 | Edwards | Jan. 4, 1898 |
| 616,602 | Carroll | Dec. 27, 1898 |
| 1,168,313 | Kenworthy | Jan. 18, 1916 |
| 1,234,257 | Bailey et al. | July 24, 1917 |
| 1,805,014 | Schalk | May 12, 1931 |
| 2,254,913 | Roth | Sept. 2, 1941 |
| 2,774,730 | Young | Dec. 18, 1956 |

FOREIGN PATENTS

| | | |
|---|---|---|
| 129,873 | Great Britain | July 24, 1919 |
| 114,150 | Australia | May 2, 1940 |
| 114,151 | Australia | May 3, 1940 |
| 861,390 | France | Feb. 7, 1941 |
| 233,011 | Switzerland | Oct. 4, 1944 |

OTHER REFERENCES

Anderson et al.: "Neutron Production and Absorption in Uranium," Phy. Rev., vol. 56, pp. 284–6 (1939).

Power, July 1940, page 58.

Smyth: "Atomic Energy for Military Purposes," August 1947. (Copy may be purchased from Supt. of Doc., Wash. 25, D.C.)

Kelly: Phy. Rev., 73, 1135–9 (1948).